(12) United States Patent
Winkler

(10) Patent No.: US 7,552,605 B2
(45) Date of Patent: Jun. 30, 2009

(54) NATURAL GRAIN LEATHER

(75) Inventor: Hermann Winkler, Malvern, PA (US)

(73) Assignee: Seton Company, Norristown, PA (US)

( * ) Notice: Subject to any disclaimer, the term of this patent is extended or adjusted under 35 U.S.C. 154(b) by 0 days.

(21) Appl. No.: 10/682,689

(22) Filed: Oct. 9, 2003

(65) Prior Publication Data

US 2004/0071895 A1      Apr. 15, 2004

Related U.S. Application Data

(60) Provisional application No. 60/418,785, filed on Oct. 15, 2002.

(51) Int. Cl.
| | |
|---|---|
| *C14B 1/00* | (2006.01) |
| *C14C 15/00* | (2006.01) |
| *C14C 9/00* | (2006.01) |
| *B05D 3/00* | (2006.01) |
| *B32B 27/30* | (2006.01) |
| *B32B 27/34* | (2006.01) |

(52) U.S. Cl. .................. 69/21; 8/94.2; 8/150.5; 427/323; 428/16; 428/540; 428/423.1

(58) Field of Classification Search .......... 428/16, 428/540, 423.4; 69/21; 8/150.5; 427/323
See application file for complete search history.

(56) References Cited

U.S. PATENT DOCUMENTS

| | | | | |
|---|---|---|---|---|
| 3,922,143 A | * | 11/1975 | Schuster et al. | .............. 8/94.21 |
| 4,601,951 A | * | 7/1986 | Fertell et al. | ............. 428/423.4 |
| 5,368,609 A | * | 11/1994 | Inoue | ......................... 8/94.22 |
| 6,379,751 B1 | * | 4/2002 | Schafer et al. | .............. 427/389 |

\* cited by examiner

*Primary Examiner*—James Seidleck
*Assistant Examiner*—Saira Haider
(74) *Attorney, Agent, or Firm*—The Webb Law Firm

(57) ABSTRACT

A leather finishing process in which, in pertinent part, a warm water milling step is added after the base coat is applied to "crust" leather and cured. The warm water contains at least one dye fixation agent including but not limited to about 0.1-2.0% by weight of formic acid. Moreover, the base coat itself is an aqueous base coat containing at least two polymers such as an acrylic salt or a polyurethane salt. Between the polymeric constituents of the base coat, the acid fixation agent, and the use of the warm water milling step after the base coat has been applied and dried, a surprisingly natural feel to the leather is attained without loss of excellent adhesion, wear-resistance and other properties when the leather is completely finished.

34 Claims, 37 Drawing Sheets

NATURAL GRAIN LEATHER

CROSS REFERENCE TO RELATED APPLICATIONS

This application claims the benefit of U.S. Provisional Patent Application No. 60/418,785, filed Oct. 15, 2002, which is incorporated herein by reference.

BACKGROUND OF THE INVENTION

1. Field of the Invention

The invention relates to a new leather manufacturing process which gives an enhanced natural feel to automotive leather without sacrificing wear, abrasion-resistance, adhesion or other qualities essential to satisfying rigorous automotive leather specifications.

2. Description of Related Art

Leather manufacturing is a technology which has developed over many centuries using cattle, goat, kid, sheep and lamb hides, and even horse, pig, kangaroo, deer, reptile, seal and walrus, among others. The properties of the leather end-product vary depending upon the type of hide as well as the method used to tan and otherwise to treat and to finish the hide used to make it. Leather production normally consists of three processes, namely, the "beamhouse" processing; tanning; and finishing. The "beamhouse" process removes dirt and unwanted constituents of the hide, such as hair. Tanning includes the physical and chemical processes whereby the collagen of the leather is crosslinked to stabilize the leather into a permanent material which will not putrefy and decompose. Finishing gives the leather the properties essential for its ultimate use.

Leather is used in an enormous variety of applications, including but not limited to furniture upholstery, clothing, shoes including athletic shoes, luggage, handbag and accessories and automotive applications, including automotive seating, and instrument panels, door panels and other interior components. Of all the uses of leather, virtually the most difficult durability specifications to meet are those in the automotive industry, because the life of the leather must be extremely long in the automotive application while at the same time the leather must be able to withstand excesses of physical stress, temperature extremes and sunlight. Traditionally, therefore, automotive leather has required intensive manufacturing treatment, usually with repeated polymer coatings during the finishing process, in order to meet the applicable strength and durability standards.

Unfortunately, the traditional addition of heavy polymer coatings to the surface of the leather has also altered the natural hand and feel of the leather, so that the most durable leathers for automotive applications heretofore also had the poorest aesthetic qualities. Ironically, these traditional, heavily coated leathers often resembled, to the discerning touch, the very vinyl or other leather-substitute materials for which satisfactory natural leather replacements were sought. Reducing the number of polymer coatings and/or the amounts of polymer applied per layer can restore natural feel to the leather but then in turn reduces wear-resistance and other strength properties. In view of the aesthetic reasons for incorporating leather into automotive interiors in the first place, rendering the leather into a seemingly polymeric product is counterproductive. Therefore, a need remains for a leather manufacturing method which can meet strict automotive standards and still retain the hand and feel characteristics of "natural" leather such as aniline and semi-aniline leather; leather types which heretofore have not had sufficient light and stain resistance to be used in automotive applications.

SUMMARY OF THE INVENTION

In order to meet this need, the present invention is a leather finishing process in which, in pertinent part, a warm water milling step is added after the base coat is applied to "crust" leather. The warm water contains at least one acid fixation agent such as, without limitation, formic acid, acetic acid, propionic acid or hydrochloric acid. The base coat itself is an aqueous base coat containing at least two polymers such as aliphatic polyurethane and acrylic. Ordinarily, in order to obtain an aqueous polymer, such as polyacrylic acid or, for example, a dimethylolpropionic acid-containing polyurethane, an amine group is admixed into the aqueous polymer solution in order to form a salt with the carboxylic acid group on the polymer molecule. The amine complexes with the carboxylic acid to form a carboxylic acid salt, thus increasing the solubility of the associated polymer. In view of the nature of the solubility of the polymers, it is believed that upon the addition of the acid fixation agent, the carboxyl groups are competitively reassociated with hydrogen, due to the excess of hydrogen ions provided by the acid. It is believed, without any intention to be bound by this theory, that this competitive reassociation, sometimes called "salting out," causes the polymer base coat to precipitate within the crevices of the leather, thus fixing the polymer well within the grain. In view of the polymeric constituents of the base coat, the use of the acid fixation agent, and the use of the warm water milling step after the base coat has been applied and dried, even after subsequent top coating, a surprisingly natural feel to the leather is attained without loss of excellent adhesion or wear-resistance.

BRIEF DESCRIPTION OF THE DRAWINGS

FIG. 1 is a photomicrograph of a flat surface of the present leather ("Prestige");

FIG. 2 is a photomicrograph of a curved surface of the present leather;

FIG. 3 is a photomicrograph of a flat surface;

FIG. 4 is a photomicrograph of a curved surface of prior art Nappa leather;

FIG. 5 is a photomicrograph of a flat surface;

FIG. 6 is a photomicrograph of a curved surface, of prior art Black Furniture leather;

FIG. 7 is a photomicrograph of a flat surface;

FIG. 8 is a photomicrograph of a curved surface, of the present leather ("Prestige");

FIG. 9 is a photomicrograph of a flat surface;

FIG. 10 is a photomicrograph of a curved surface, of prior art Nappa leather;

FIG. 11 is a photomicrograph of a flat surface, and

FIG. 12 is a photomicrograph of a curved surface, of prior art Black Furniture leather;

FIG. 13 is a photomicrograph of a flat surface;

FIG. 14 is a photomicrograph of a curved surface, of the present leather ("Prestige");

FIG. 15 is a photomicrograph of a flat surface;

FIG. 16 is a photomicrograph of a curved surface, of prior art Nappa leather

FIG. 17 is a photomicrograph of a flat surface;

FIG. 18 is a photomicrograph of a curved surface, of prior art Black Furniture leather;

FIG. 19 is a photomicrograph of a flat surface, and

FIG. 20 is a photomicrograph of a curved surface, of the present leather ("Prestige");

FIG. 21 is a photomicrograph of a flat surface, and

FIG. 22 is a photomicrograph of a curved surface, of prior art Nappa leather;

FIG. 23 is a photomicrograph of a flat surface, and

FIG. 24 is a photomicrograph of a curved surface, of prior art Black Furniture leather;

FIG. 25 is a photomicrograph of a flat surface;

FIG. 26 is a photomicrograph of a curved surface of the present leather ("Prestige");

FIG. 27 is a photomicrograph of a flat surface;

FIG. 28 is a photomicrograph of a curved surface, of prior art Nappa leather;

FIG. 29 is a photomicrograph of a flat surface;

FIG. 30 is a photomicrograph of a curved surface, of prior art Black Furniture leather;

DESCRIPTION OF THE PREFERRED EMBODIMENTS

Figure 1:
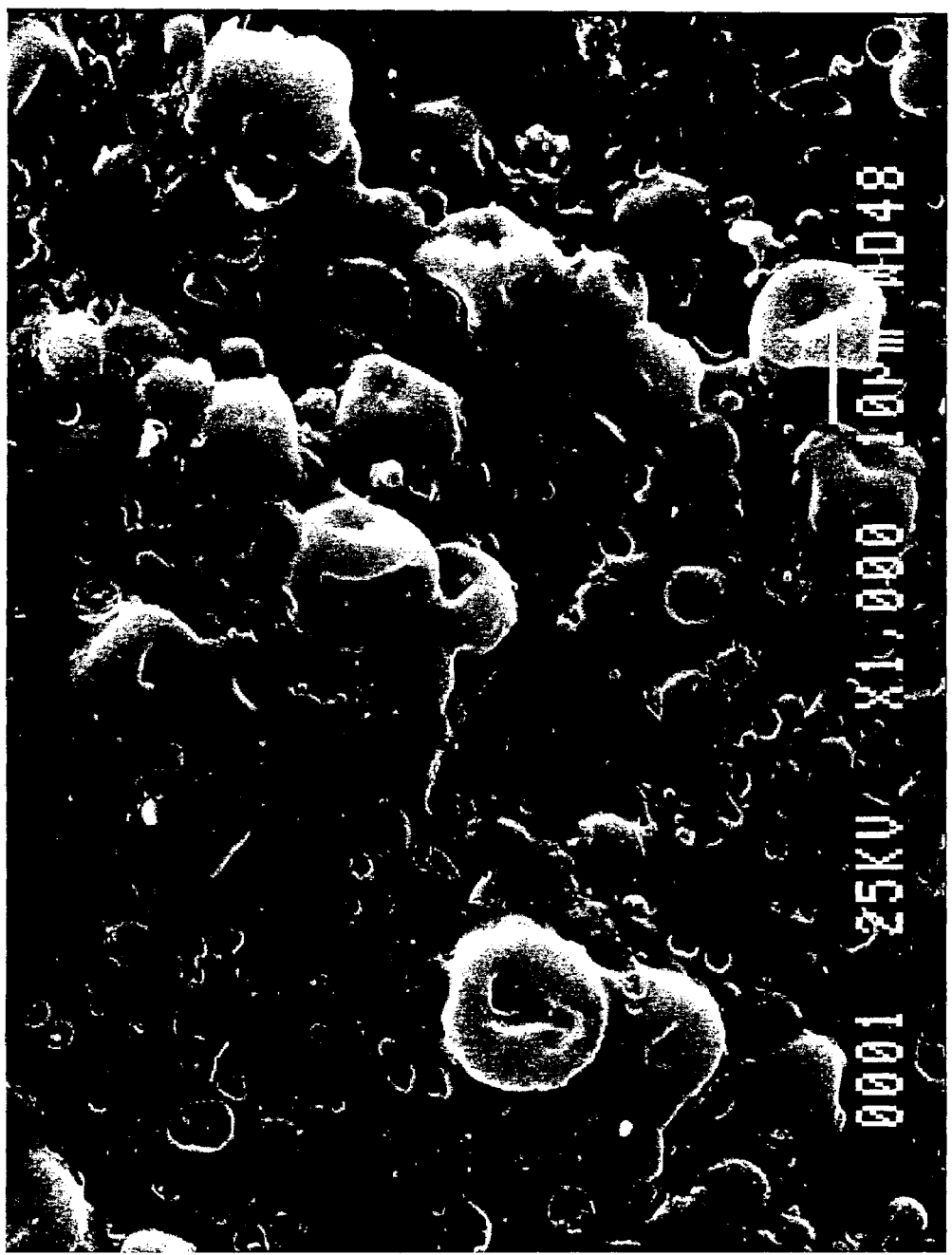
FIGS. 1-6 are scanning electron micrographs of flat and curved surfaces of three representative samples of different leathers at 1,000× magnification.
Figure 2:
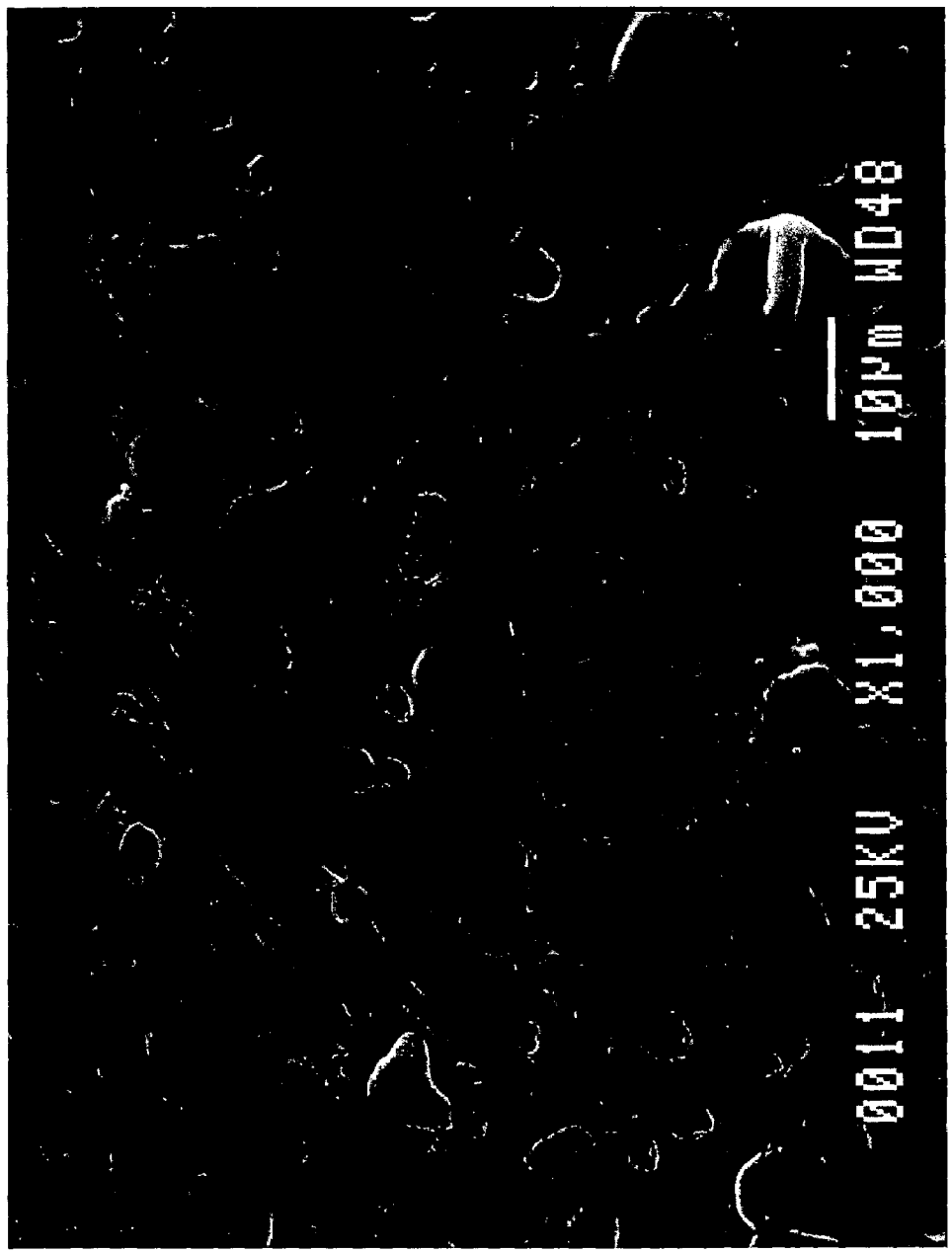
Figure 3:
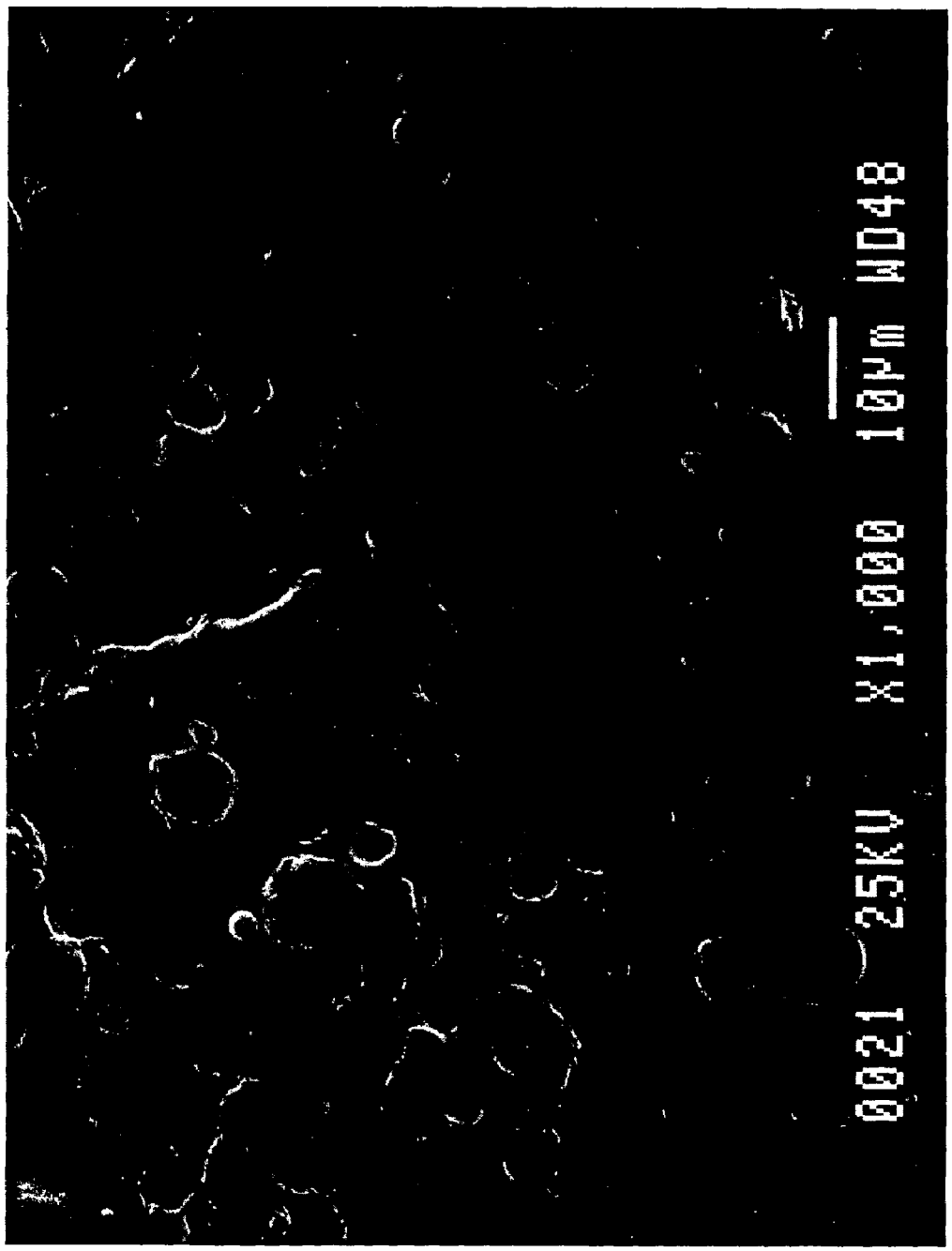
Figure 4:
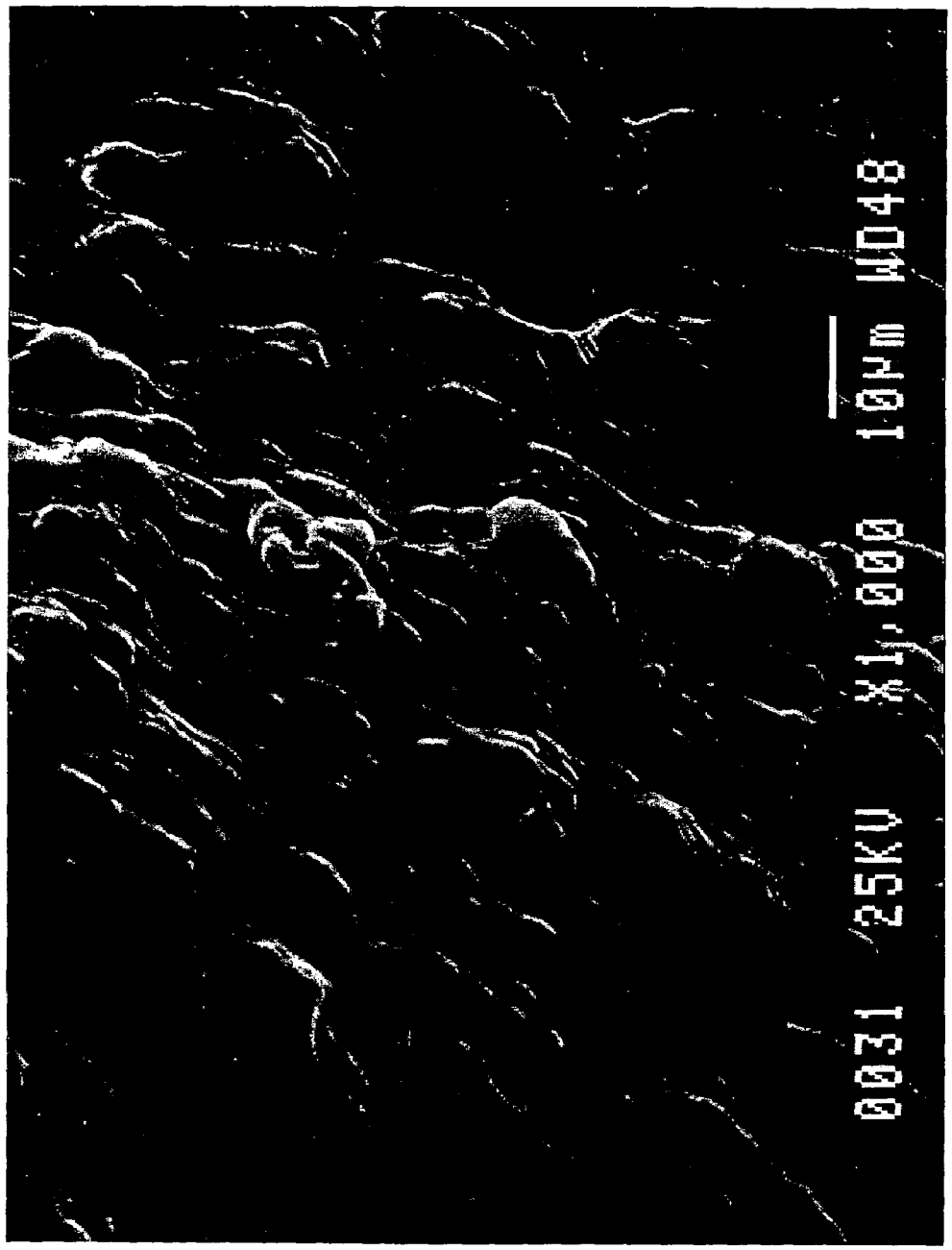
Figure 5:
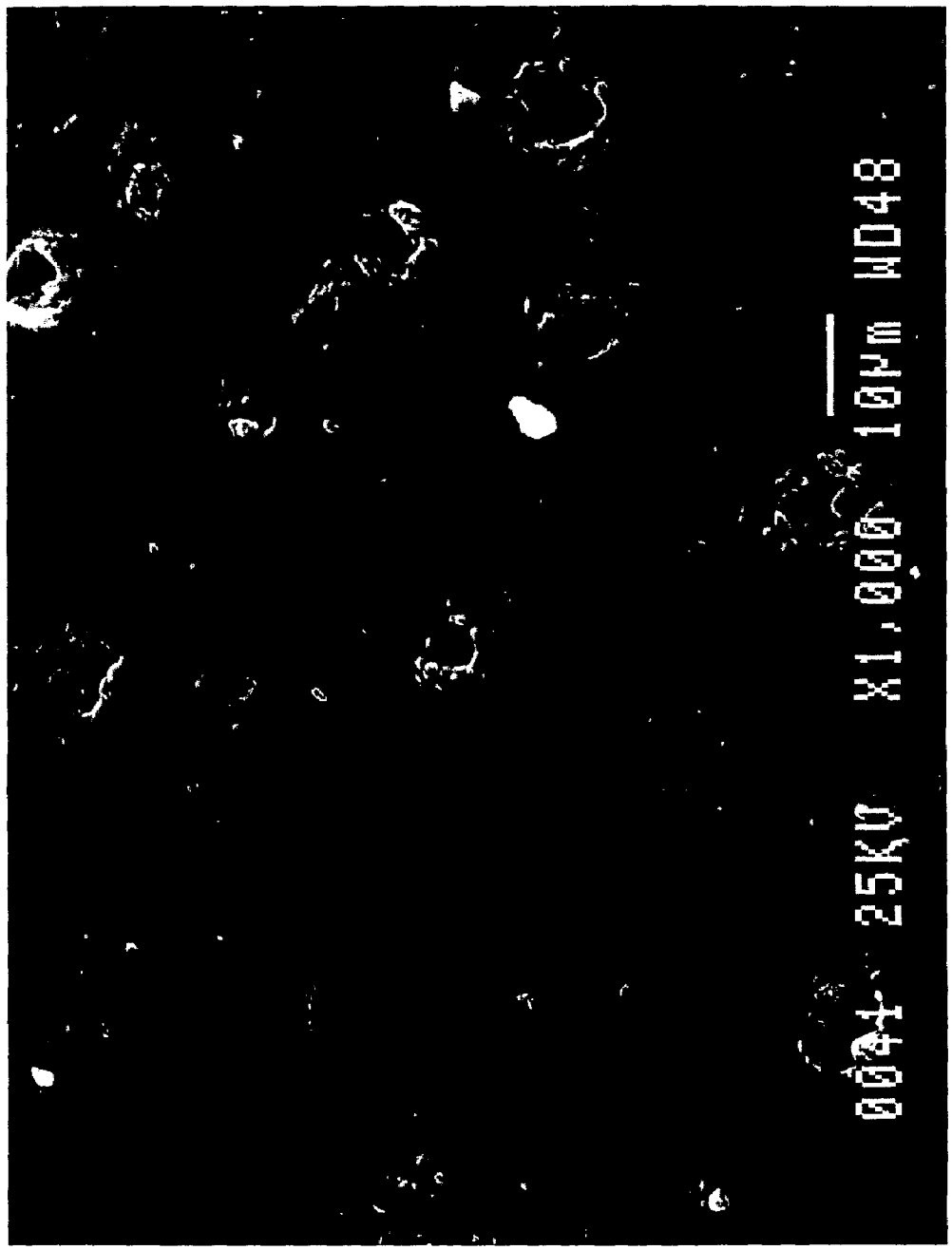
Figure 6:
Figure 7:
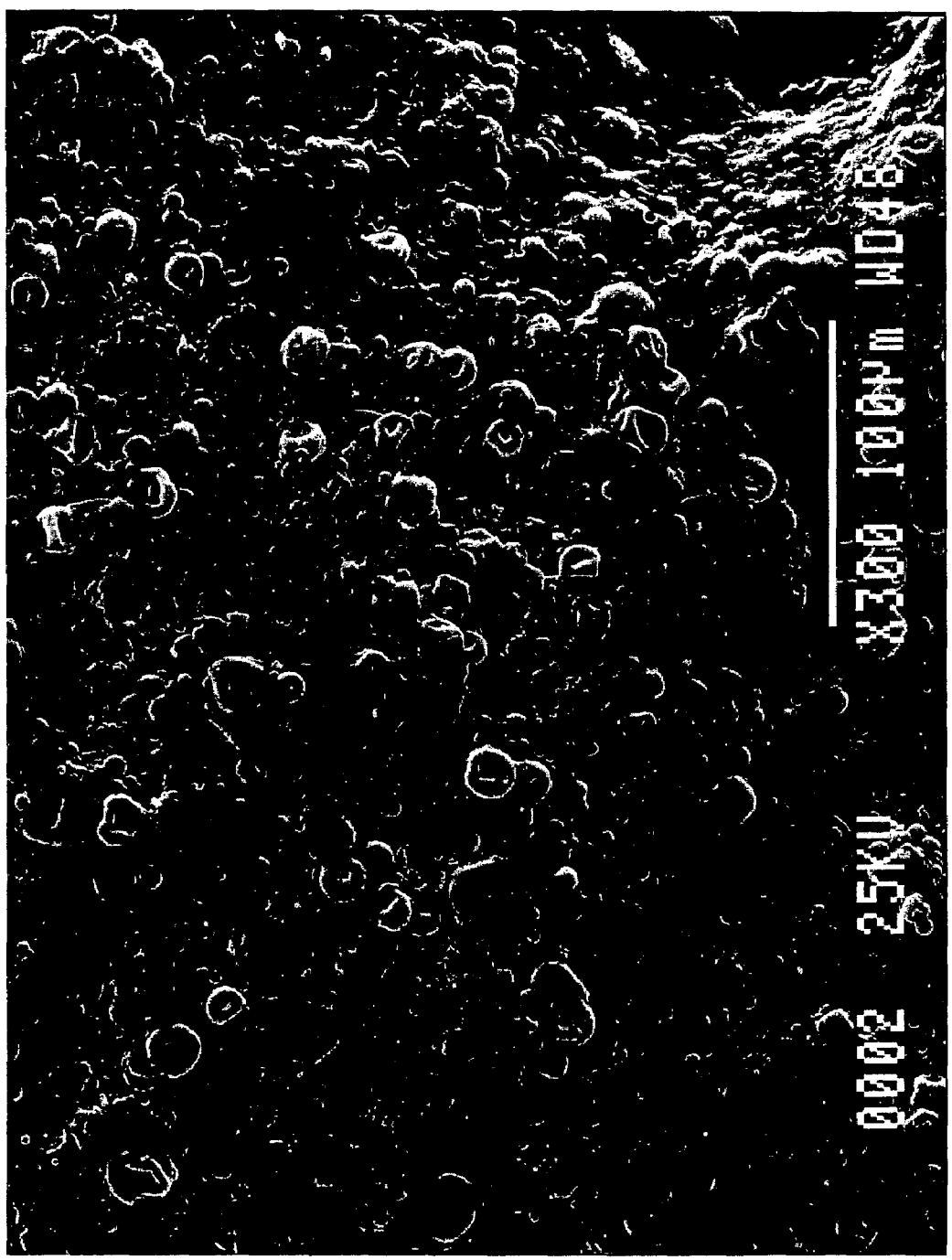
FIGS. 7-12 are scanning electron micrographs of flat and curved surfaces of three representative samples of different leathers at 300× magnification.
Figure 8:
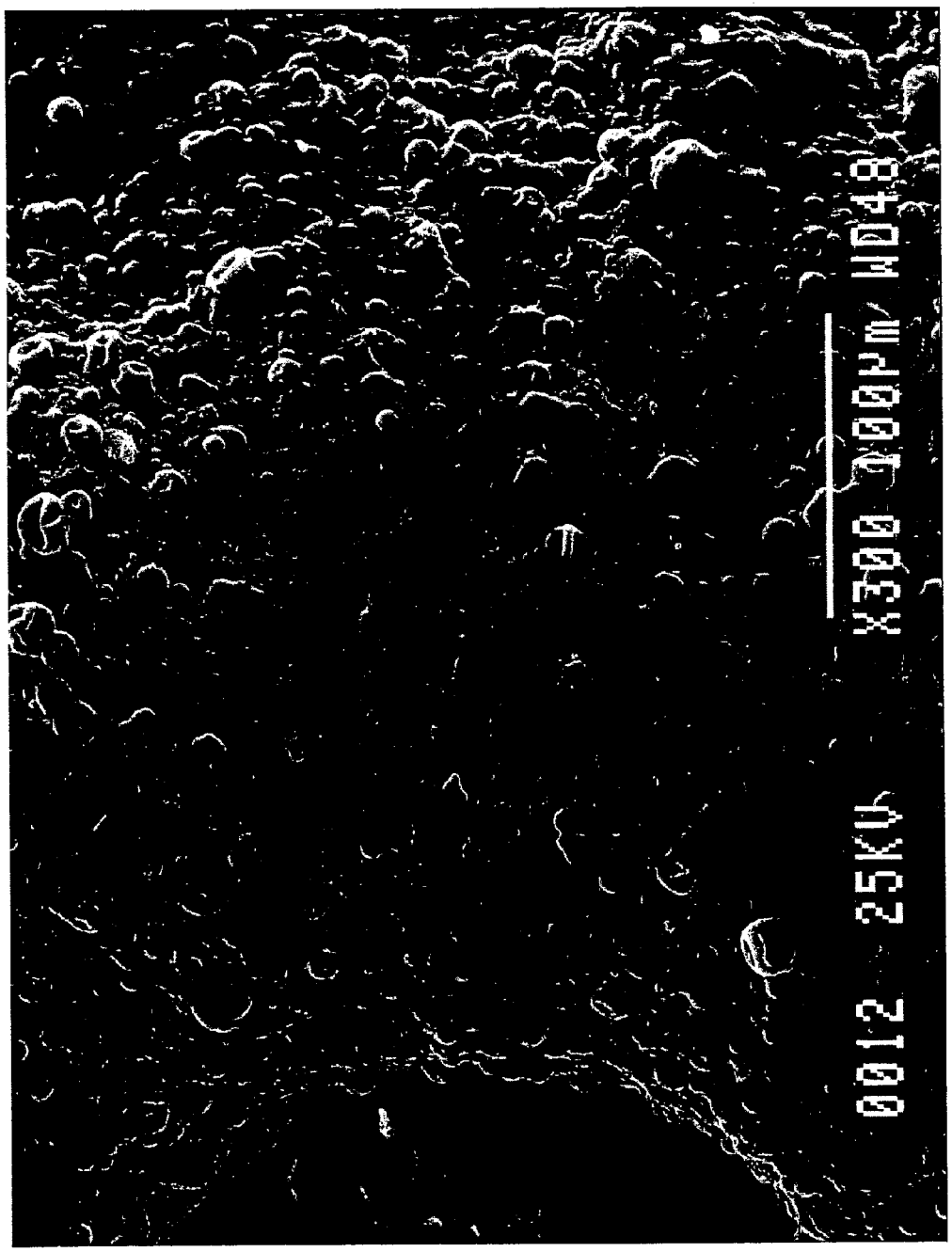
Figure 9:
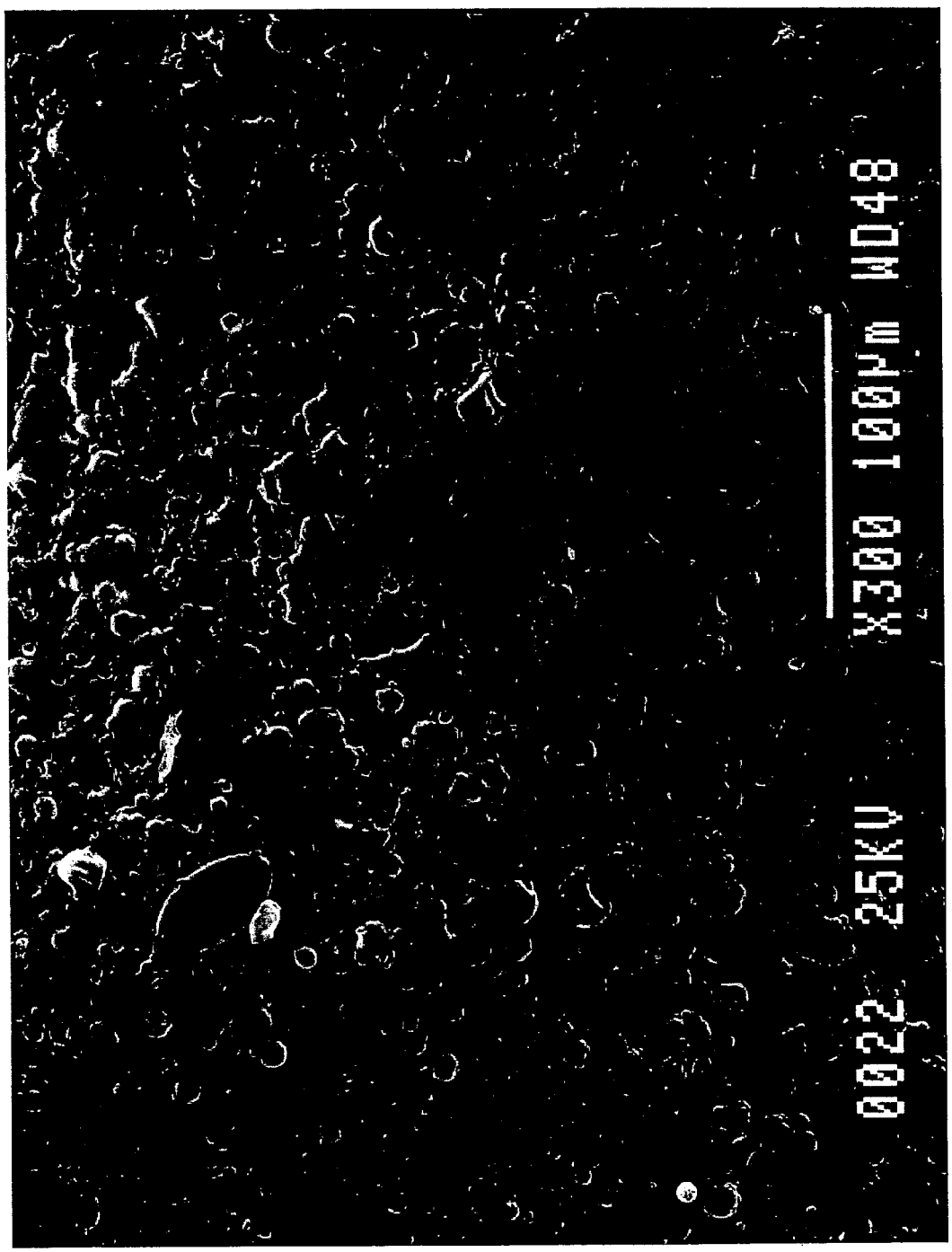
Figure 10:
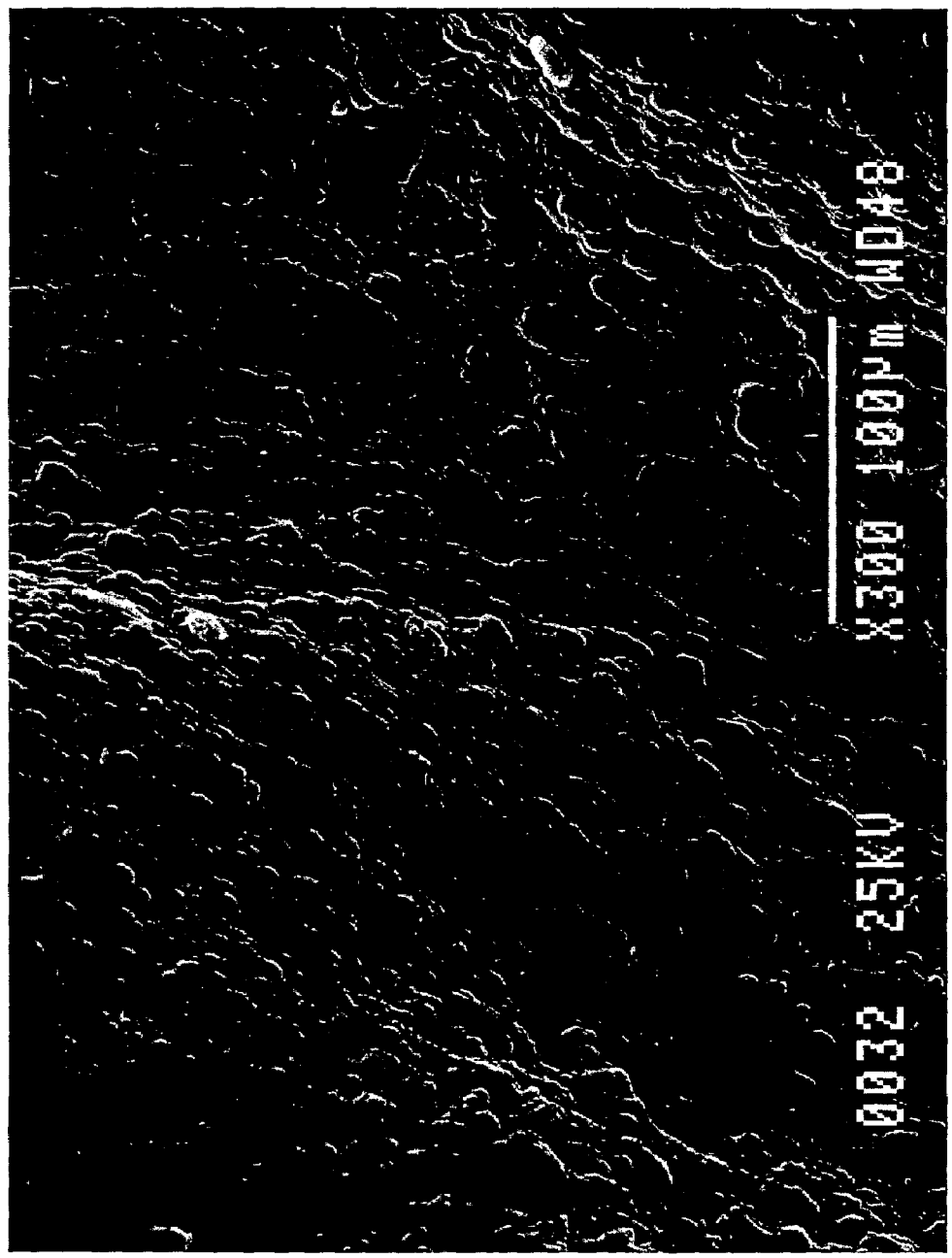
Figure 11:
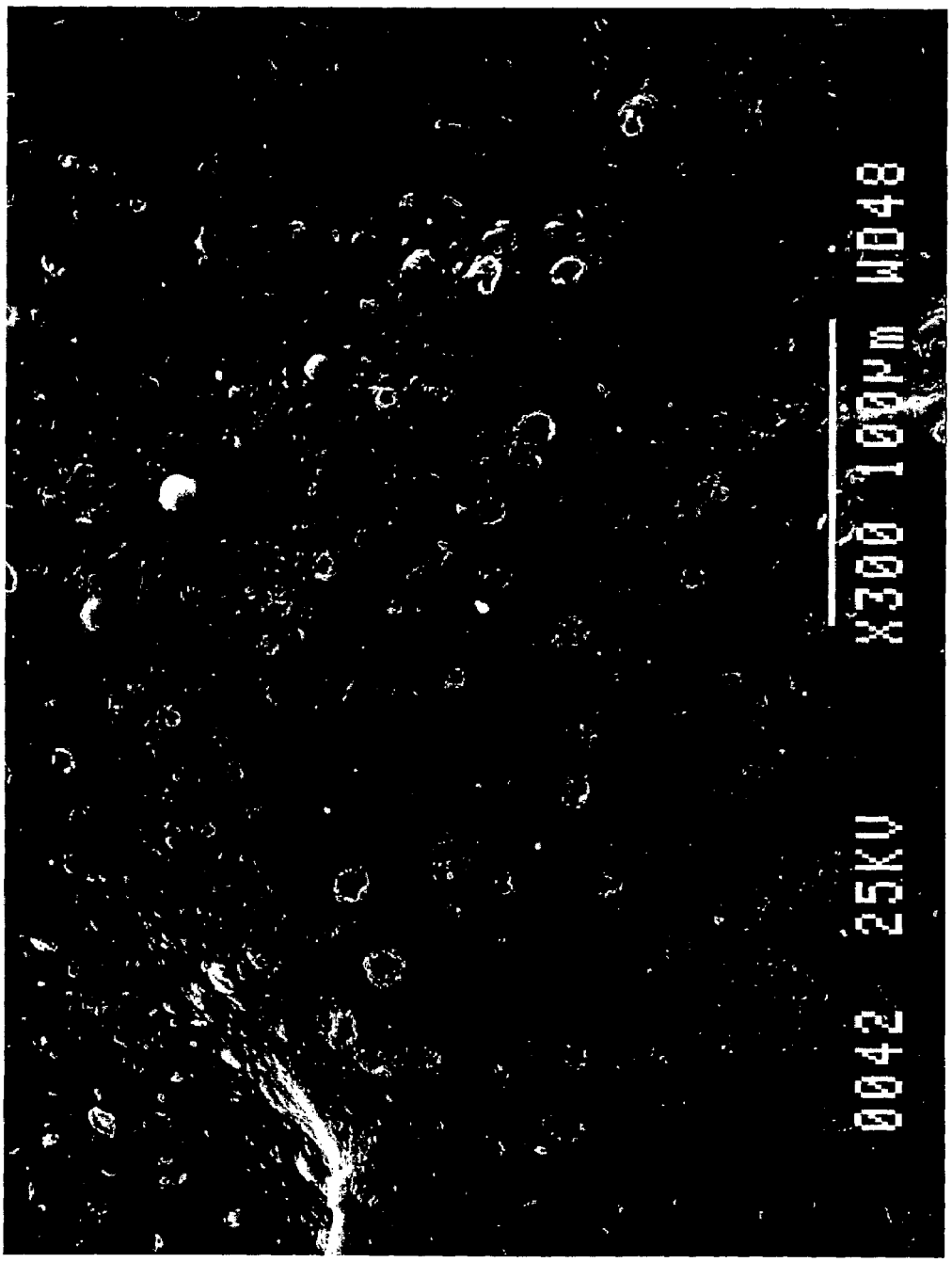

The essential method step of the present invention inheres, in pertinent part, within the finishing step of the leather manufacturing process. All manner of tanning and retanning leather processes of all types are therefore suitable to adaptation and improvement by the methods disclosed herein. For example, the present finishing process may be practiced on chrome-tanned and non-chrome-tanned leathers alike, or on any type of hide as long as it is a natural collagen-containing animal skin. In order to establish context, the following brief summary of basic leather manufacturing is provided below.

The "beamhouse" process is generally the first step in the tanning process and includes soaking freshly skinned or cured hides in order to prevent their putrefaction prior to further processing. The curing step tends to remove moisture from the hides, causing them to become hard and difficult to work with. As a result, the first wet process which is used after curing is the simple soaking and rehydrating of cured hides, followed by soaking in salts and other rehydrating agents. After soaking, the hides may be fleshed to remove the excess tissue and to remove muscles or fat adhering to the hide. Hides are then dehaired to ensure that the grain is clean and that the hair follicles are free of hair roots, by using liming processes, scraping, or both. When liming is used, it is followed by deliming. If the hides have not previously been fleshed, they may be fleshed after liming.

Bating is then performed, in which the hides are treated with proteolytic enzymes to purify the material prior to tanning. Bating loosens the hide structure and removes unwanted proteins, thus imparting a softness, stretch and flexibility to the leather. Bating and deliming may be performed together in a combined deliming-bating solution. Bating is followed by "pickling," or soaking in acid(s) and salt(s) in order to bring the hides to the desired pH for tanning.

The second phase, the "tanning" phase, involves the use of chromium-containing tanning agents, vegetable-based tanning agents, or other tanning agents. The purpose of the tanning agents is to crosslink the collagen in the hides. Chrome tanning is performed using a one-bath process that is based on the reaction between the hide and a trivalent chromium salt, usually a basic chromium sulfate. Vegetable tanning agents are similarly applied to the hides by soaking the hides, sometimes for several days, in aqueous solutions of tanning agents extracted from plant material parts such as fruits, pods, and roots. Typically, what is referred to as tanning also includes a "retanning" step, prior to finishing, comprising neutralization, retanning, dyeing, fat-liquoring, toggling and milling. More particularly, hides are neutralized, tanned again, often in a different tanning agent than was originally used, in order to impart the desired properties, colored with water-soluble dyes and treated by applying "fat-liquoring" agents, literally oil materials intended to replace the natural oils in the hides that were lost in all the previous processing. Toggling refers to clamping the hides onto screens, followed by oven drying the hides while they are stretched on the screens. Milling is then performed, that is, the retanned and toggled hides are tumbled in drums to soften them.

The first and second phases of leather production are well known in the art and do not form a central part of the present invention. At this point in the leather production process, the hides are referred to as "crust" leather, that is, leather which has been tanned and retanned but not yet finished. Crust leather will not putrefy and has extraordinary natural feel, but is not suitable for many, if any, applications because it is very soft, will not pass present automotive specifications, and readily absorbs any oil or dirt with which it comes in contact and which thereafter is impossible to remove.

Finishing of the crust leather according to the invention generally involves the steps of base coating, optional clear top coating, and milling in warm water, followed by toggling, further milling, staking, and application of one or more top coats followed by additional milling and staking. Of these finishing steps, the steps essential to the present invention are the base coat composition and its application, and the warm water milling acid fixation step. The base coat to be used to coat the crust leather, for the purpose of the present invention, is an aqueous composition containing both polyurethane and acrylic. Any aqueous solutions or dispersions of polyurethane and acrylic coating compositions may be combined in order to practice the present invention.

In the preferred embodiment, the base coat contains about 60% of an aqueous acrylic composition containing, in pertinent part, about 20% acrylic and about 0.4% propanol (such as isopropanol), admixed with about 2% polyurethane in aqueous dispersion together with 10% silica duller by weight, about 22% silica drier by weight, and about 2-3% pigment by weight. Exemplary commercially available compositions which may be admixed include, without limitation, aqueous acrylic AB 810 (Quaker Color division of McAdoo & Allen, Inc., Quakertown, Pa.), aliphatic polyurethane dispersion JK-233 (Quaker Color), BS 287 silica duller (Quaker Color), BS 457 silica drier (Quaker Color), together with pigments known in the art. The polyurethane should be present in the base coat in the amount of about 1-10% by weight, preferably about 2-4% by weight, most preferably about 2% by weight; the acrylic should be present in the composition in the amount of about 10-40% by weight, more preferably about 15-30% by weight and most preferably about 20% by weight. Additional ingredients may be added according to the skill in the art, but as long as the polyurethane and the acrylic are present in the base coat, in the above amounts, the base coat may be used in the practice of the present invention.

After base coating, warm water milling is conducted by loading the hides into drums and immersing and tumbling them in warm water containing at least one acid fixation agent such as, without limitation, formic acid, acetic acid, propionic acid or hydrochloric acid. The hides are immersed in 150-300% by weight 45 degrees C. water and tumbled for about 1 hour. The water temperature may be varied from 30-55 degrees C., more preferably 35-50 degrees C., most preferably 45 degrees C. It should be appreciated that inserting a warm water tumbling step into a leather manufacturing process, immediately following base coating, is not only not customary but may be tantamount to heresy in the leather manufacturing world. For one thing, leather manufacturers often separate their wet-treatment facilities from their coating facilities for environmental and other regulatory reasons, because wet-process leather tanning is not allowed in all industrial areas. Moreover, the traditional wisdom of leather processing has assumed that all wet-processing should take place during the preparation of the crust leather, and that the focus of the finishing phase should be on the coating of the leather, not the further saturation of the hides with excesses of water. Hides thus warm water tumbled are subsequently toggled, milled, staked, top coated, milled and softened according to means known in the art. (Staking may be accomplished using a "Vibrasoft" machine, which is a specialized machine in which plates are equipped with multiple engaging "fingers" (protrusions), which push and pull at the leather surface to stretch it without perforating the hide.) Milling during finishing often involves dry-tumbling the hides to soften them. Toggling, milling and staking are well known in the leather making arts.

Ordinarily, in order to obtain an aqueous polymer, such as polyacrylic acid or, for example, a dimethylolpropionic acid-containing polyurethane, an amine group is admixed into the aqueous polymer solution in order to form a salt with the carboxylic acid group on the polymer molecule. The amine complexes with the carboxylic acid to form a carboxylic acid salt, thus increasing the solubility of the associated polymer.

In view of the nature of the solubility of the polymers, it is believed that upon the addition of the acid fixation agent, the carboxyl groups are competitively reassociated with hydrogen, due to the excess of hydrogen ions provided by the acid. It is believed, without any intention to be bound by this theory, that this competitive reassociation, sometimes called "salting out," causes the polymer base coat to precipitate within the crevices of the leather, thus fixing the polymer well within the grain.

After the base coat application and warm milling step is completed, the crust leather is dried and optionally further applied with a small amount of clear top coat prior to warm water milling. The amount of the base coat to be applied to the crust leather may range up to the amount of base coat typically applied to Nappa leathers of the prior art, or may be reduced to approximately half the amount of base coat compared to the amounts traditionally applied to Nappa leather. For example, a typical Nappa leather according to the prior art can have applied to the crust leather 3.0-4.0 grams per square foot of base coating composition, whereas in the practice of the present invention the base coat may be applied in amounts as little as 1.0-2.0 grams per square foot or less, preferably 1.5-1.7 grams per square foot, as well as greater amounts. This reduction in the amount of base coat undoubtedly contributes to the natural characteristics of the ultimate leather product prepared using the inventive finishing steps.

In view of the polymeric constituents of the base coat, the use of the acid fixation agent, and the use of the warm water milling step after the base coat has been applied and dried, even after subsequent top coating a surprisingly natural feel to the leather is attained without loss of excellent adhesion or wear-resistance. In theory, although there is no intention to be bound by the theory, it is believed that the combination of at least two polymers in the aqueous base coating composition, namely, polyurethane and acrylic, creates an effective yet migratable coating on the crust leather, particularly in view of the salting out precipitation effect. The coating thus formed is believed to be able to migrate, during warm water milling, to descend into the lowermost crevices of the grain of the leather, in order to expose somewhat the grain and hair cell features which would otherwise be covered more thickly with base coat. Regardless of the mechanism by which the invention operates, however, empirically the combination of the base coat, the acid fixation and the warm water milling gives leather with improved natural feel while simultaneously creating leather capable of passing all major automotive wear-resistance and other tests. Data objectively corroborating various features which correlate with the improved natural feel are presented hereinafter.

Finished leather can be subjected to various analytical and experimental methodologies in order to determine qualitative and quantitative characteristics of different leather samples. Such characteristics can vary substantially depending on the leather finishing techniques employed. Analytical techniques used in the industry include, without limitation, international wear evaluation that consists of the following tests: Wyzenbeek wear-high wear; taber abrasion; Veslic dry, wet and sweat colorfastness; Gakushin friction; traverse abrasion; pilling wear; and Honda abrasion; softness evaluation including G.M. pliability, BLC, frank stiffness, relative stiffness, Ford stiffness, bending, and Renault softness; long term Xenon evaluation which includes light resistance as quantified by change in color properties as measured by delta L, delta E, delta a, delta b, percent shrinkage, and gloss changes; wet heat cycle test; water vapor permeability test; and Nissan slide friction test. Experimental methodologies that are used to quantify typical leather characteristics include, without limitation, acoustic emission analysis and microscopic analysis. Scanning and transmission electron miscroscopy, as well as polarized light microscopy, can be used to study how various surface treatments affect the break (wrinkle) pattern observed on the leather surfaces when leather samples are placed in a U-shaped "half pipe" jig typically having a diameter of 70 mm and attached thereto with backing tape or adhesive. Using such microscopic techniques, the relationship of the degree of the break pattern to surface and cross-section morphology can be examined. It is well known in the art that the nature and severity of the break pattern defines the acceptability of the leather product for a particular application, such as automotive leather. Specifically, scanning electron microscopy can be used to characterize the surface morphology of leather samples, transmission electron microscopy can be used on thin sections of leather samples to resolve structural features, and polarized light microscopy can be used to examine the cross-sections of thick sections of leather samples.

The present finishing method may be used in any other leather manufacturing process, for grain leather, embossed leather, or corrected leather, particularly those hides destined for automotive use. The leathers may be chrome-tanned or non-chrome-tanned, may be natural in color or include dyes and pigments, and may be retanned, fat-liquored or top coated with any materials known in the art. The central feature of the invention is the combination of the particular base coating step with the warm water milling step which follows the application of the base coat, and this central feature may be transplanted into numerous other leather processes, especially for the automotive industry.

Although the invention has been described above, the following Examples are illustrative.

EXAMPLE 1

Cattle hides were collected and treated from hair removal through tanning and retanning, toggling and drying to create crust leather. A base coat in the amount of 1.5-1.7 grams per square foot was applied to the surface of the crust leather and allowed to dry at about 75-100 degrees C. A thin layer of clear top coat was applied immediately over the base coat and likewise allowed to dry at about 75-100 degrees C. The hides were then loaded into a drum with 150% by weight 45 degree C. water and tumbled for an hour. The hides were then subsequently gently squeezed dry without rolling, toggled, milled for 8 hours without added water, staked, sprayed with top coat, allowed to dry, and treated with final staking and milling treatments to soften them. The resulting leather had a much softer, warmer hand and feel than traditional Nappa leather, displayed excellent "break" in the leather, and yet satisfied major automotive leather specifications in test results described below.

The leather finished according to the above, treated with a single top coat, was subjected to abrasion testing using dry white felt, wet white felt and artificail-perspiration soaked white felt repeatedly drawn across the leather. In order to achieve a 5 on a scale of 1-5, the felt had to remain free of any pigment from the leather. In tests involving multiple repetitions of abrasion by each felt, with repetition numbers exceeding the repetitions necessary for commercial automotive quality control, the leather described above consistently scored a "5."

The same leather hides were tested according to standard automotive testing procedures which test adhesion, flexometer and abrasion as measured in Newtons (N). While only 3 N was necessary to meet the adhesion test, the hides exhibited 9.63 N. The minimum grade of 4 N on the flexometer 20.000 test was necessary to meet automotive standards, and the hides exceeded this standard with 5 N.

The same leather hides were tested according to certain additional, international test standards. The Toyota test method 5.9.2B was used to subject the hides to 10,000 cycles per each five minutes of 1.8 KGF tension and 2.8 weight, but the leather was able to withstand 30,000 cycles. Likewise, the Nissan NES MO155-15.2 test (taber abrasion, CS10 wheel, 1,000 grams, 1,000 cycles) was used to test the hides, which survived 3,000 cycles. While the Mercedes test DIN 53,339 requires Veslic rub, dry, 2,000 cycles, the leather hides described above were able to withstand 6,000 cycles. All of these test results are surprising in view of the soft, natural hand and feel of the leather; in the past, leather subjected to tests such as these have been heavily coated and heavily compromised as to aesthetics.

EXAMPLE 2

A quantity of hides were treated in exactly the same way, from hair removal to finishing, except that a warm water milling step was added after the base coat was applied to some of the hides and the remaining hides were base coated without a subsequent water milling step. The base coat enumerated in Example 1 was used in the amount of 3.0-3.5 grams per square foot of hide on all the hides; roughly double the amount of base coat as used in Example 1. Notwithstanding the additional amount of base coat, the hides that were warm water tumbled displayed significantly improved hand, feel, break (as judged in the half pipe test), softness and apparent warmth as compared to the hides that were not warm water milled. The hides which had been warm water milled subsequent to base coating also had a more pronounced visual appearance of leather grain and hair cells compared to the hides which had not been warm water milled.

EXAMPLE 3

Finished hides of four chrome-tanned prior art leathers ("Vision," "New Frontier," "Classique," "Salon"), as well as a chrome-tanned leather of the present invention ("Prestige"), were subjected to volatile organic hydrocarbon (VOC) analysis in order to determine the total VOC content (mg/kg) of the leathers, using the Toyota Tedlar Bag Method. Of the five finished hides tested, "Prestige" had the lowest VOC content of 0.05 mg/kg. The other four prior art leathers had substantially higher VOC contents, ranging from 0.6 mg/kg up to 2.6 mg/kg.

EXAMPLE 4

Finished hides of four chrome-tanned prior art leathers ("Vision," "New Frontier," "Classique," "Salon"), as well as a chrome-tanned leather of the present invention ("Prestige"), were subjected to formaldehyde analysis using the Toyota Tedlar Bag, IUC 19 Photometric, and IUC 19 HPLC test methods in order to determine the formaldehyde concentration (mg/kg) in the leathers. Using the Toyota Tedlar Bag method, "Prestige" leather exhibited no formaldehyde concentration; "Salon," "Classique," and "New Frontier" had 0.01 mg/kg formaldehyde concentration; and "Vision" had 0.05 mg/kg formaldehyde concentration. Using the IUC 19 Photometric method, "Prestige," "Salon," "Classique" and "New Frontier" had less than 0.1 mg/kg formaldehyde concentration. Finally, using the IUC 19 HPLC method, "Prestige" had the lowest formaldehyde concentration of 1 mg/kg.

The other four prior art finished hides had formaldehyde concentrations ranging from 2.5 mg/kg ("Salon") up to 20 mg/kg ("Vision").

Experiment 1—Microscopy Analysis

1. Materials and Methods

A. Scanning Electron Microscopy (SEM)

SEM was used to examine samples of leather ("Prestige") prepared according to Example 1, as well as samples of prior art Nappa and Black Furniture leathers. SEM uses a highly focused electron beam (less than 10 nm diameter) which can be scanned in a raster on the sample surface. The intensity of secondary electrons produced at each point is used to form a picture of the sample. Magnification factors from 10× to 100,000× can be obtained. The depth of field is inherently quite large which allows the micrographs to be in focus at all points across a rough surface. In addition, SEM does not suffer from light reflecting off at odd angles and being lost from view, a problem encountered with light microscopy.

Leather samples were submitted as approximately 9 inch×9 inch sheets. The sheets were initially examined using a Bausch and Lomb StereoZoom stereoscope. A small one-inch square piece was sectioned from each sample for scanning electron micrograph examination. An adhesive-backed paper was applied to the backside of the leather products. Each leather sample was then prepared in two ways. A section was applied flat onto an aluminum mount using a carbon double-sided adhesive tape. A second section was affixed with backing tape into a U-shaped half-pipe with a constructive 70 mm diameter. This device simulates the concave curvature used in break pattern testing. The samples were gold coated using an SPI Supplies Sputter Coater Module System to ensure electrical conductivity in the SEM. The analysis was conducted using a scanning electron microscope manufactured by JEOL (USA), Inc. of Peabody, Mass. Representative scanning electron micrographs were obtained on two representative areas in series form at the magnifications of 10×, 30×, 100×, 300×, and 1,000× using 0 degree tilt and 25 KeV. Images were captured digitally directly from the scanning electron microscope using the Spectrum Mono software package.

B. Polarized Light Microscopy (PLM)

PLM was used to examine samples of present leather ("Prestige"), as well as samples of prior art Nappa and Black Furniture leathers. PLM is a method for determining the unique optical crystallographic properties of various crystal phases in a sample. PLM is an invaluable tool in the identification of crystalline materials and, when used in conjunction with dispersion staining, is typically used in the identification of minerals such as asbestos. The combination of PLM with dispersion staining makes it possible to systematically identify transparent substances by their dispersion colors in known refractive index media. The technique can be used to examine thick sections of polymers in order to determine their crystalline and spherilitic structure, surface (skin) effects, and inconsistencies in morphology which can be caused by the lack of homogeneity in the polymers. PLM methodology can be used to examine materials prepared under similar conditions and to obtain information on sections with regard to their gross similarities or differences.

PLM was performed on the leather samples using a Vickers M41 PhotoPlan Light Microscope marketed by Vickers' Instruments of Malden, Mass. Sections of the leather samples were cut and mounted in a 1.550 Refractive Index Liquid and a glass coverslip was added. The sections were examined using brightfield light and representative images were taken at 141×.

Dimensional measurements made on all of the micrograph images are accurate to within 10% of their stated values.

2. Results

A. SEM

Flat surfaces of the present leather ("Prestige") (FIGS. 1, 7, 13, 19, 25) were found to exhibit a fairly uniform surface structure with a number of "pits" believed to correspond to hair cells or pores. Higher magnifications revealed a coated surface that contained a high concentration of particles, approximately 10 μm in size. Curved surfaces of Prestige leather (FIGS. 2, 8, 14, 20, 26) revealed similar structures, with the addition of a series of shallow ridges. The peak to peak distance between adjacent shallow ridges were 1 mm or less.

Flat surfaces of prior art Nappa leather (FIGS. 3, 9, 15, 21, 27) revealed a smooth surface with little evidence of hair cells or pores. A number of ridge-like features were observed on the surface. Higher magnifications revealed a higher concentration of coating particles than what was observed with Prestige leather. Curved surfaces of Nappa leather (FIGS. 4, 10, 16, 22, 28) revealed significantly larger ridges than those observed on the Prestige leather. The peak to peak distance between the ridges ranged from 1 mm to several millimeters.

Flat surfaces of prior art Black Furniture leather (5, 11, 17, 23, 29) more closely resembled Prestige leather than Nappa leather because of the presence of hair cells or pores. The pores observed in the leather, however, appeared less distinct and more coated with particles than those observed in the Prestige leather. The surface of the Black Furniture leather also appeared smoother than Prestige leather, which was likely due to the smaller size of the coating particles found on the Black Furniture leather. Curved surfaces of Black Furniture leather (FIGS. 6, 12, 18, 24, 30) revealed sharp channels and ridges, as well as flat islands. Some deeper channels with an almost crack-like appearance were also observed. The peak to peak distance between the ridges ranged from 1 mm to 2 mm.

B. PLM

Figure 31:
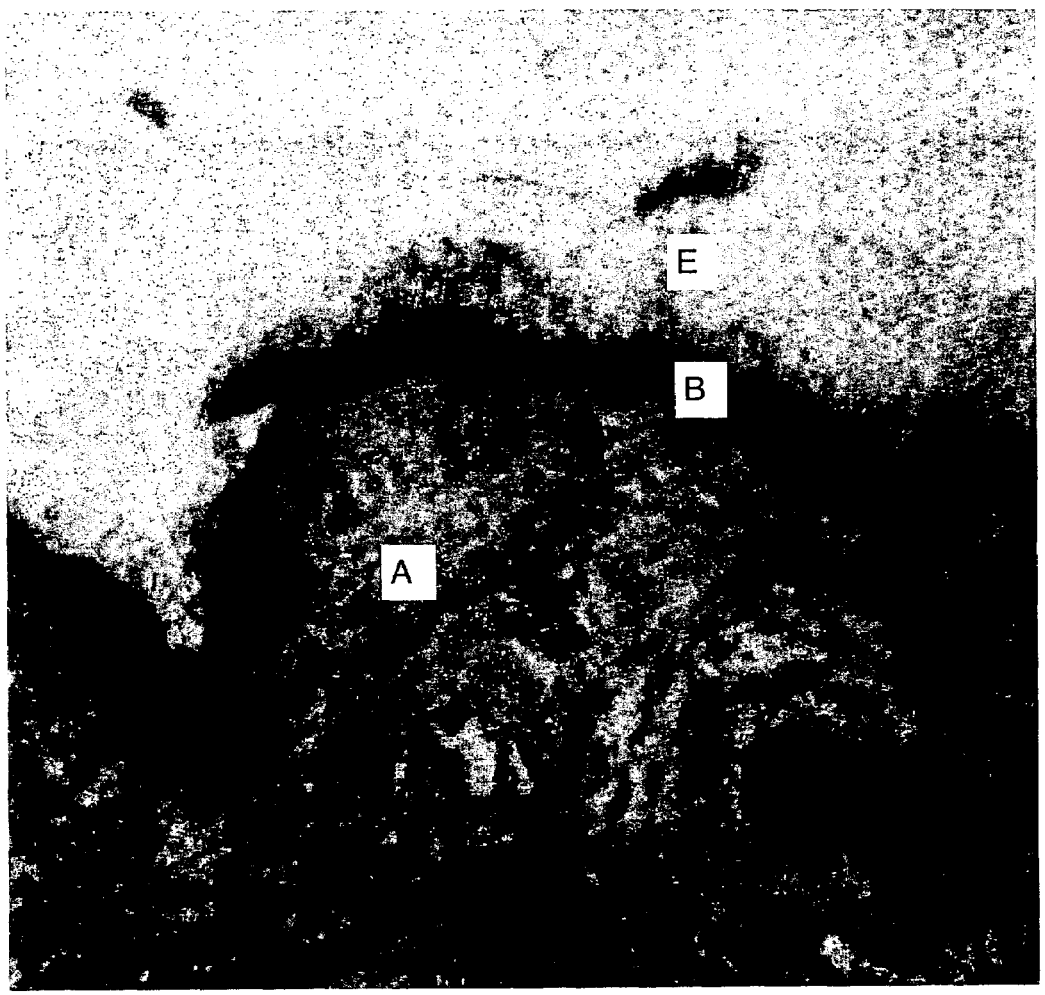
FIG. 31 is a polarized light micrograph of the present leather ("Prestige") (magnified 141×)

The leather of the present invention ("Prestige") (FIG. 31) revealed a coating layer on the thick sections. The leather substrate, or skin (Area A), the coatings on the surface (Area B), and the epoxy layer (Area E) can all be observed clearly. The coatings appeared to fill in deep pore regions and extend down well below the surface. The coatings, however, did not appear to totally fill the pores. The coating thickness was approximately 30-40 μm.

Figure 32:
FIG. 32 is a polarized light micrograph of prior art Nappa leather (magnified 141×)

Cross sections of prior art Nappa leather (FIG. 32) revealed a coating layer of approximately 90 μm, which was two to three times thicker than what was observed on the Prestige leather. The coating layer appeared continuous with no apparent breaks, and pore areas were generally not infiltrated by the coating material, although there was evidence of some penetration of the coating into the surface of the leather.

Figure 33:
FIG. 33 is a polarized light micrograph of prior art Black Furniture leather (magnified 141×)
Figure 34:
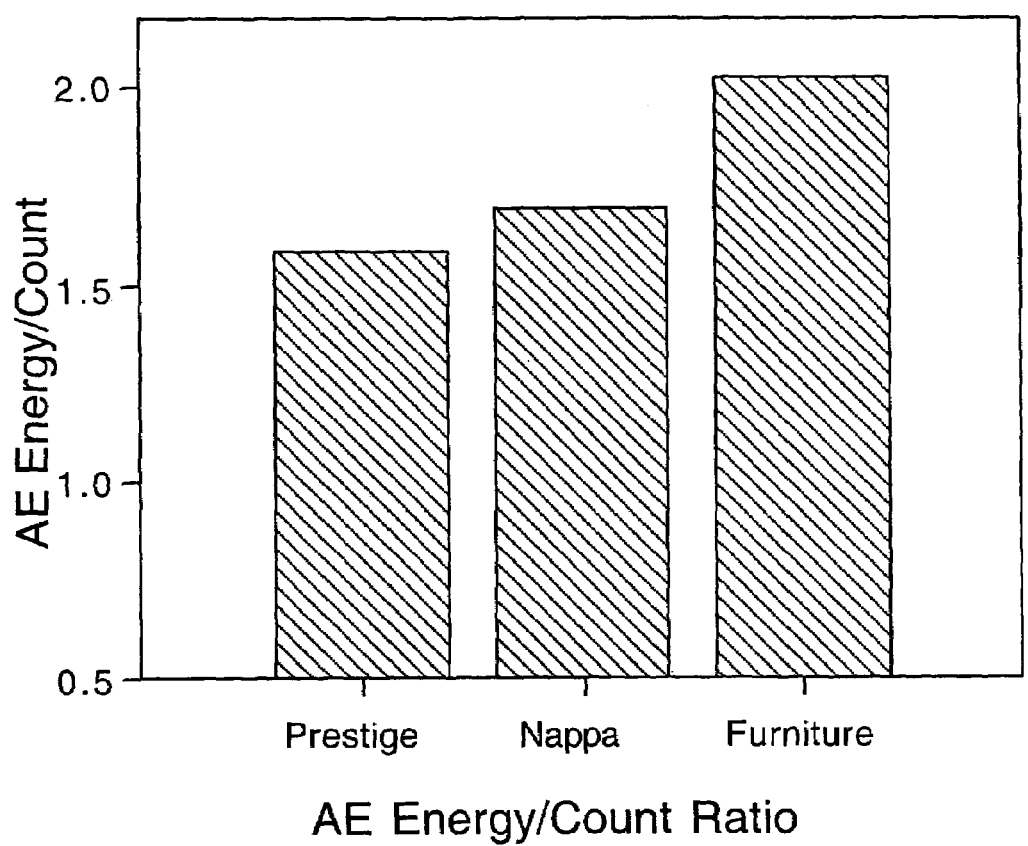
FIG. 34 is a bar graph that illustrates break evaluation data for the leather of the present invention ("Prestige") as well as prior art Nappa and Furniture leathers, utilizing acoustic emission (AE) technology to determine the AE energy/count ratio.
Figure 35:
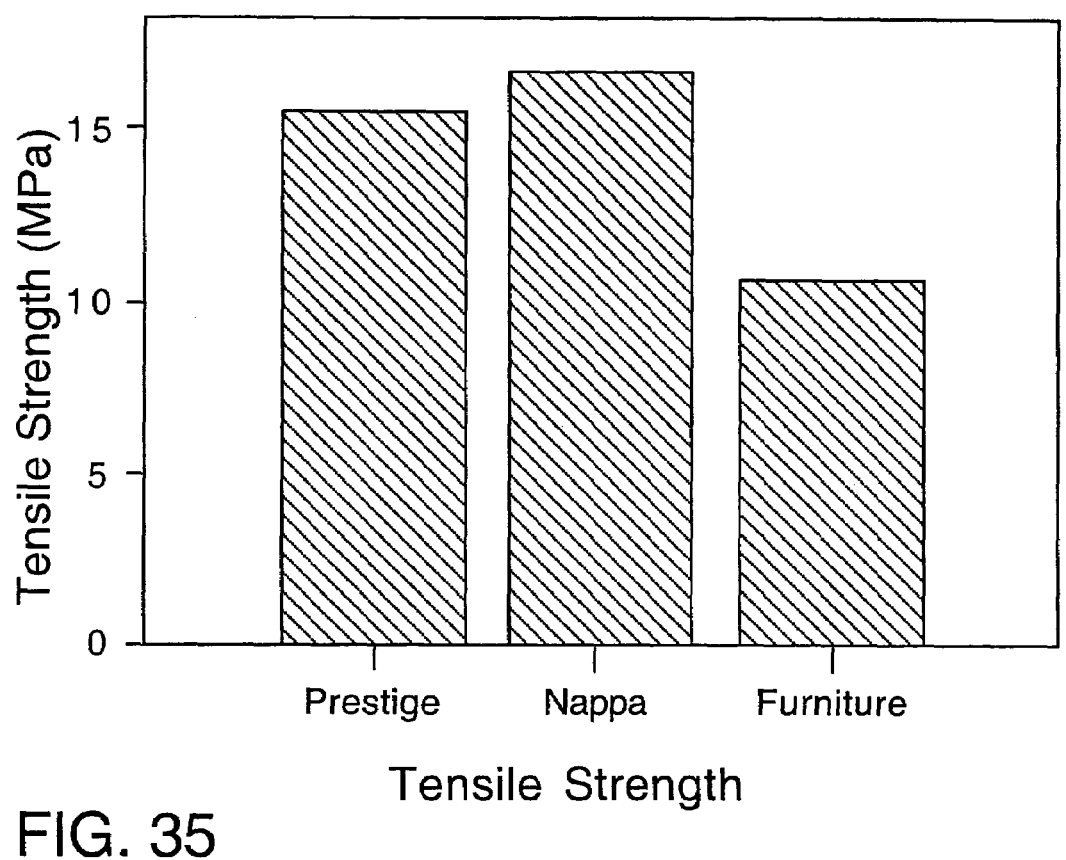
FIG. 35 is a bar graph that illustrates tensile strength evaluation data of the leather of the present invention ("Prestige") as well as prior art Nappa and Furniture leathers, utilizing AE technology to determine the tensile strength of the three leathers.
Figure 36:
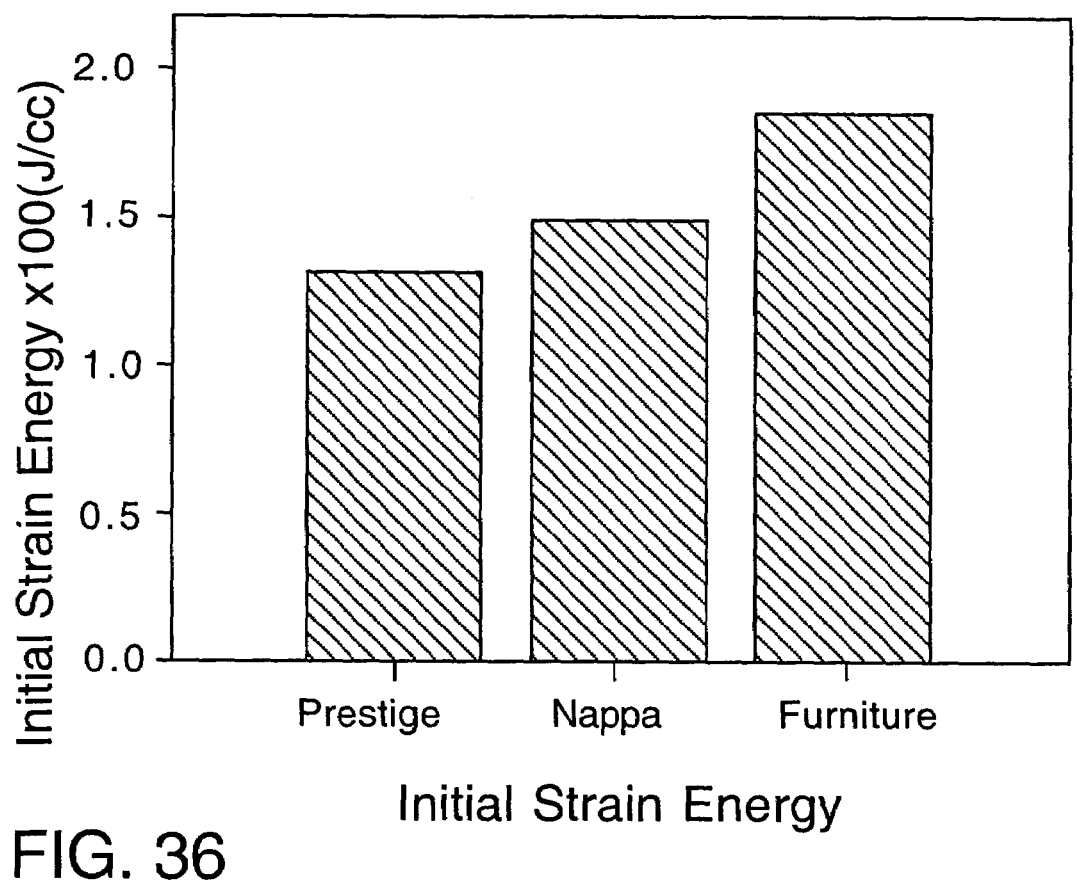
FIG. 36 is a bar graph that illustrates initial strain energy data of the leather of the present invention ("Prestige") as well as prior art Nappa and Furniture leathers, utilizing AE technology to determine the softness of the three leathers, as well as their resistance to small deformations.
Figure 37:
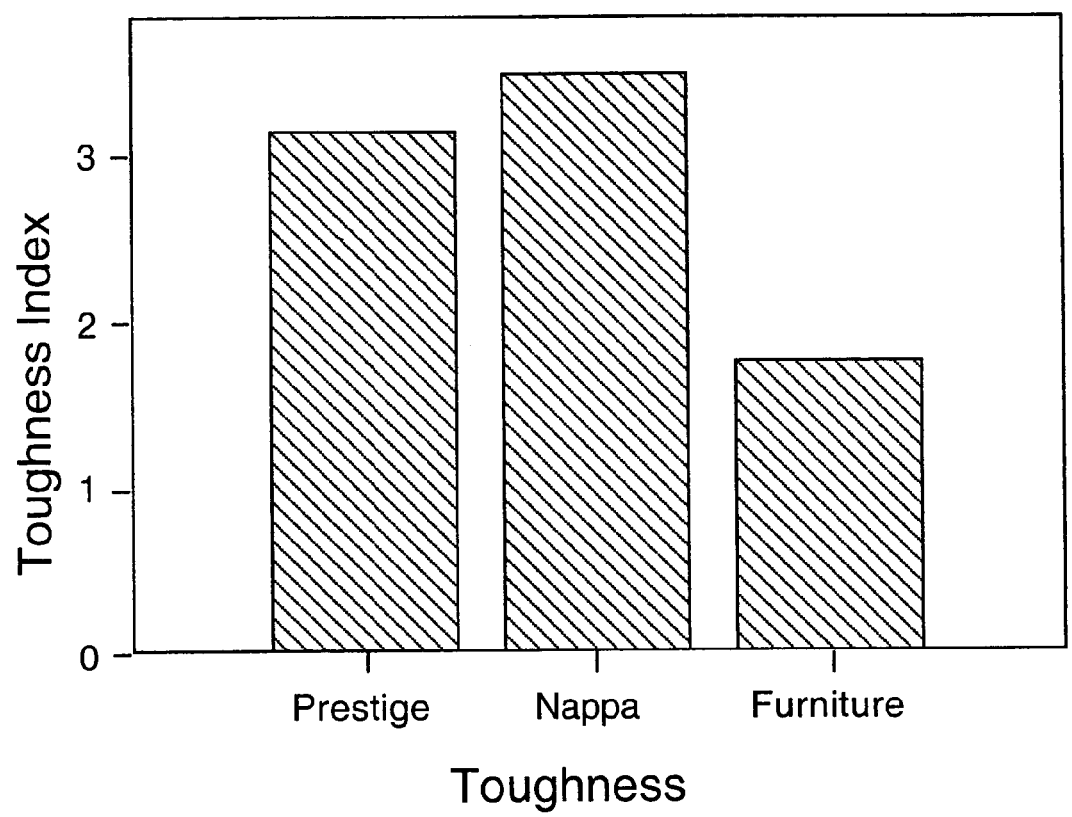
FIG. 37 is a bar graph that illustrates toughness indices of the leather of the present invention ("Prestige") as well as prior art Nappa and Furniture leathers, utilizing AE technology to determine the strength, robustness and stiffness of the three leathers.

Prior art Black Furniture leather (FIG. 33) revealed a thin coating layer approximately 20 μm in thickness. The coating layer was generally uniform with some areas, typically around the pores, having a thinner coating than other areas. The coating did not fill the pores although it did extend into some of the underlying voids.

3. Discussion

Microscopic analysis indicates that the nature and extent of the coating was at least partially responsible for the observed break patterns, which suggests a complex mechanism for the formation of the observed break patterns in the three types of leather examined. The leather of the present invention ("Prestige") revealed a relatively thin coating layer with unfilled pores which allowed the surface of the leather to fold along lines from pore to pore, thus minimizing the uplifting of the ridge areas and producing a desirable break pattern.

Prior art Nappa leather revealed a heavy coating layer that almost completely filled the few pores that were present and appeared to form some of the surface ridge features. This resulted in leather with no pore features that could "absorb" the folding of the leather. Bending the leather created large, wide ridges, and revealed that the thick coating layer was more restrictive than the present leather, characteristics that become apparent only when the leather is affixed with backing tape to a substrate.

In prior art Black Furniture leather, pores were observed; however, either they were not as deep as the pores observed with the present leather or they may have been partially filled with coating material. An embossing feature on the surface of the leather was also observed, which resulted in the formation of a number of deep channels. When the leather was curved, it appeared to create folds along the channels that had a greater spacing and a bigger break pattern than what was observed in either the present ("Prestige") or Nappa leathers.

4. Conclusions

The leather of the present invention ("Prestige") revealed numerous hair cells or pore structures that appeared to be responsible for minimizing the height of ridge formation during break testing. Prior art Nappa leather was observed to have a thick coating with little or no exposed pore structures. Curving the Nappa leather resulted in the formation of large, unacceptable ridges. Prior art Black Furniture leather revealed a number of pores, however they were not deep or were partially filled with coating. Embossing of the Black Furniture leather created deep channels. Curving the Black Furniture leather created folds along the channels that had greater spacing, larger ridges, and a bigger break pattern than what was observed in the either the present ("Prestige") or Nappa leathers, with the present leather having the smallest peak to peak ridge distance of 1 mm or less.

Experiment 2—Acoustic Emission Technology

The analysis herein was conducted in association with the Eastern Regional Research Center of the United States Department of Agriculture. Acoustic emission (AE) technology is an experimental method capable of characterizing the physical/mechanical properties of leather and provides a non-destructive way to monitor the quality of leather without damaging the leather in the process. AE technology was used to measure the flexing endurance of the leather coatings of the leather of the present invention ("Prestige"), as well as prior art Nappa and Black Furniture leathers. In effect, this technique is able to "listen" and analyze sounds emitted by leather as it is being stretched. The particular parameters evaluated were break pattern, tensile strength, initial strain energy, and toughness.

1. Break Evaluation

To evaluate break patterns, each leather sample was bent into a 16 cm half pipe jig and affixed thereto with backing tape. A special sensor moved across the surface at a constant weight and speed. Fibers of the leather were compressed, causing the sides of each fiber to rub against one another, thus emitting acoustic signals. When the leather was bent, this compressed the grain, which, because of its attachment to the half-pipe jig with backing tape, produced tension in the underlying corium layer. Gaps or "looseness" between the grain and corium layers gave off more AE energy per count because the grain was not firmly attached to the corium and therefore rubbed against the corium as the sensor moved along the surface of the leather. (The looser the connection between the grain and corium layers, the poorer the break pattern, which results in a higher energy per count ratio).

Figure 12:
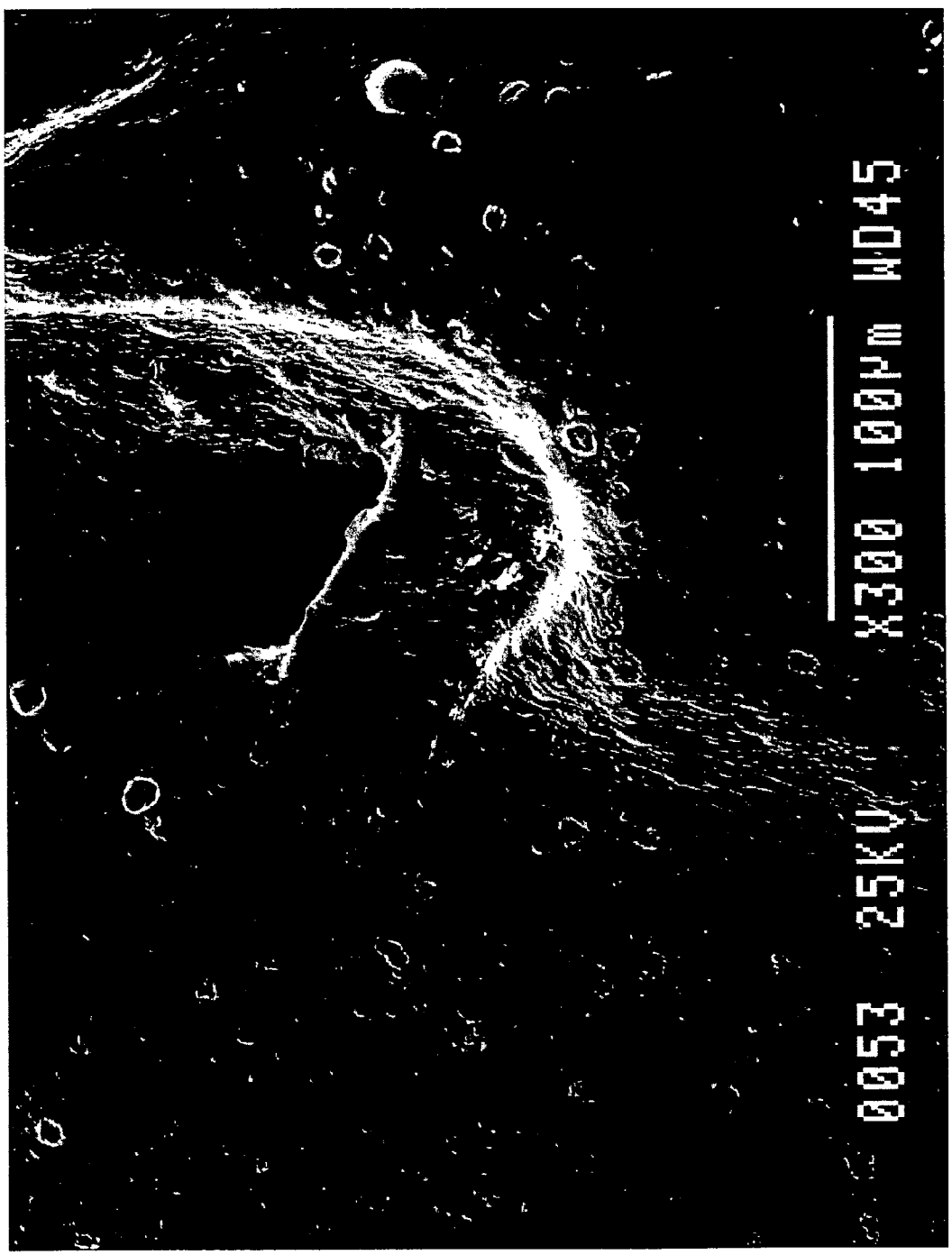

The leather of the present invention ("Prestige"), as well as prior art Nappa and Black Furniture leathers, were subjected to AE break evaluation. Of the three leathers tested, the present leather had the lowest AE energy/count ratio of 1.6 or less. Black Furniture leather had an intermediate AE energy/count ratio of 1.7, and Nappa leather had the highest AE energy/count ratio of 2.0 (FIG. 12). Thus, when secured with backing tape to a substrate, of the three leathers that were tested, the present leather ("Prestige") exhibited the best break pattern. This indicates that the grain and corium layers of the present leather were the most intact, whereas the gaps between the grain and corium layers of Black Furniture leather were more pronounced. Nappa leather had the poorest break pattern, indicating that this leather contained the most gaps and "looseness" between its grain and corium layers.

2. Tensile Strengh

Tensile strength is one of the most important qualities of leather. Ordinarily, it is measured by stretching a leather sample until it breaks and recording the degree of force needed for breakage. This operation is both time consuming and destructive. Using AE technology, leather needs only to be stretched a small amount in order to determine its tensile strength.

Figure 13:
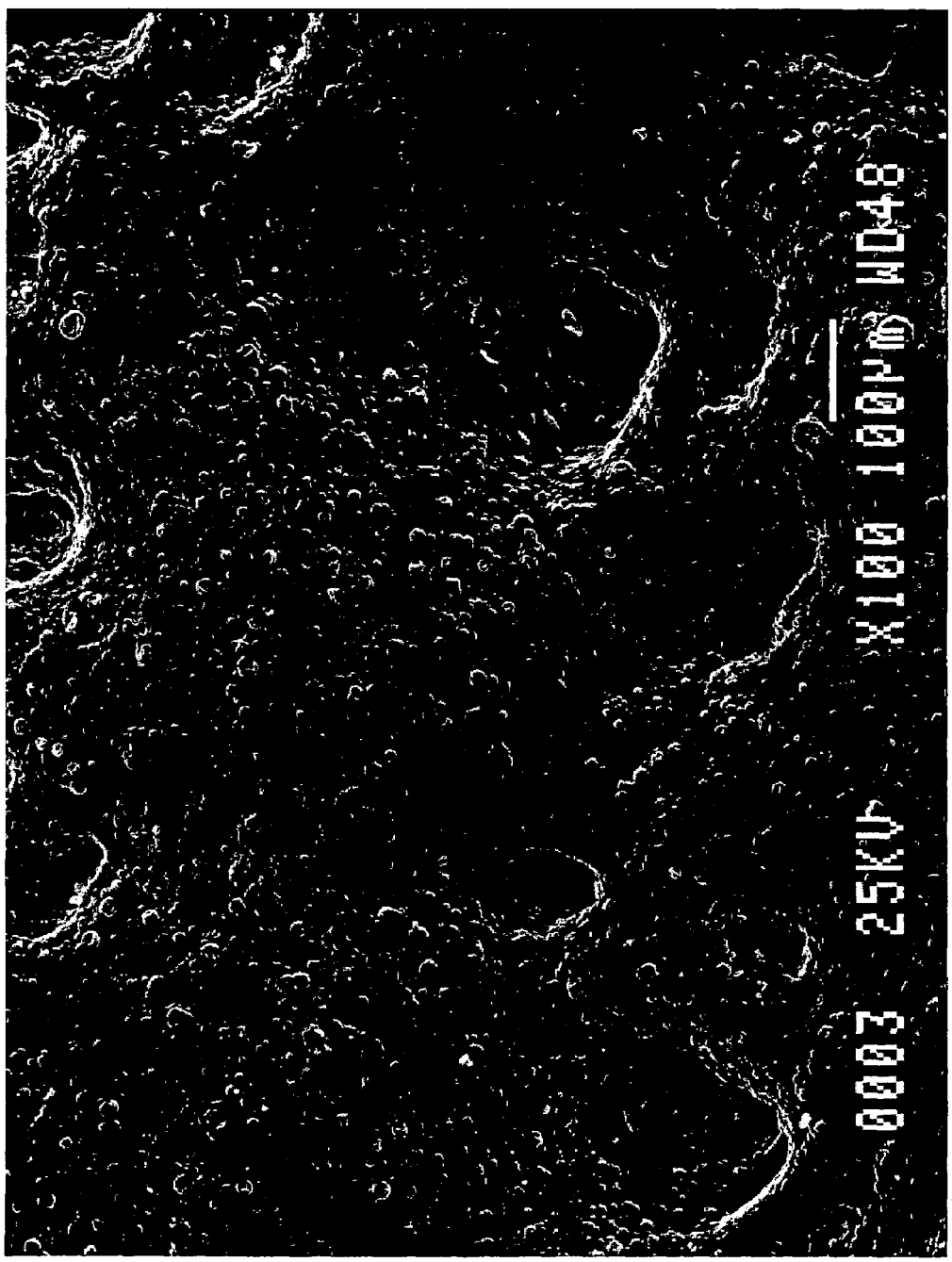
FIGS. 13-18 are scanning electron micrographs of flat and curved surfaces of three representative samples of different leathers at 100× magnification.

There is a cumulative correlation between the tensile strength of leather and initial AE energy. Thus, AE technology was used to determine the tensile strength of the leather of the present invention ("Prestige"), as well as prior art Nappa and Black Furniture leathers. The present leather and Black Furniture leather exhibited comparable tensile strength that was approximately 30% higher than what was observed in Nappa leather (FIG. 13). Thus, according to this analysis, Nappa leather was weaker and more prone to breakage than either the present leather or Black Furniture leather.

3. Initial Strain Energy

Initial strain energy indicates the softness of the leather and its resistance to small deformations. Initial strain energy is defined as the energy needed to stretch leather to a 10% strain level (area under the stress/strain curve from 0-10% strain). The higher the initial strain energy, the stiffer the leather. Initial strain energy testing is used to characterize the softness of leather taking into account the non-viscoelasticity of leather.

Figure 14:
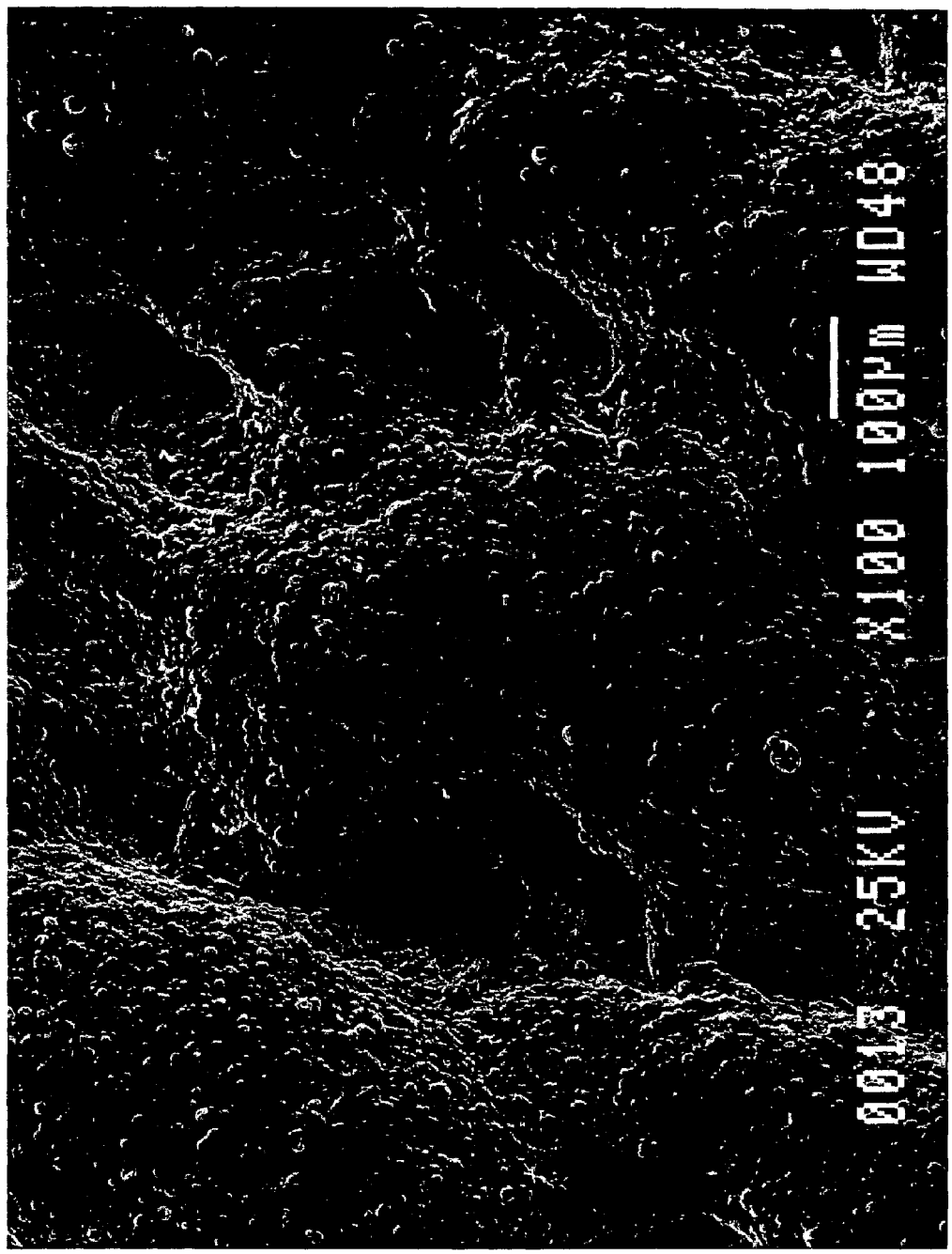

The leather of the present invention ("Prestige"), as well as prior art Nappa and Black Furniture leathers, were subjected to AE initial strain evaluation. The present leather had the lowest initial strain energy, prior art Black Furniture leather had an intermediate value, and prior art Nappa leather had the highest initial strain energy (FIG. 14). The results demonstrated that the present leather was approximately 50% softer than prior art Black Furniture leather and approximately 25% softer than Nappa leather. The results also indicated that the present leather exhibited the greatest resistance to small leather deformations when compared to either the Nappa or Black Furniture leathers.

4. Toughness Index (TI)

The degree of toughness exhibited by leather correlates with the strength, robustness and softness of the leather. Furthermore, leather having a stiffer grain correlates with poor strength. It is well known in the art that poor strength and a stiff grain results in a poor break pattern.

Figure 15:
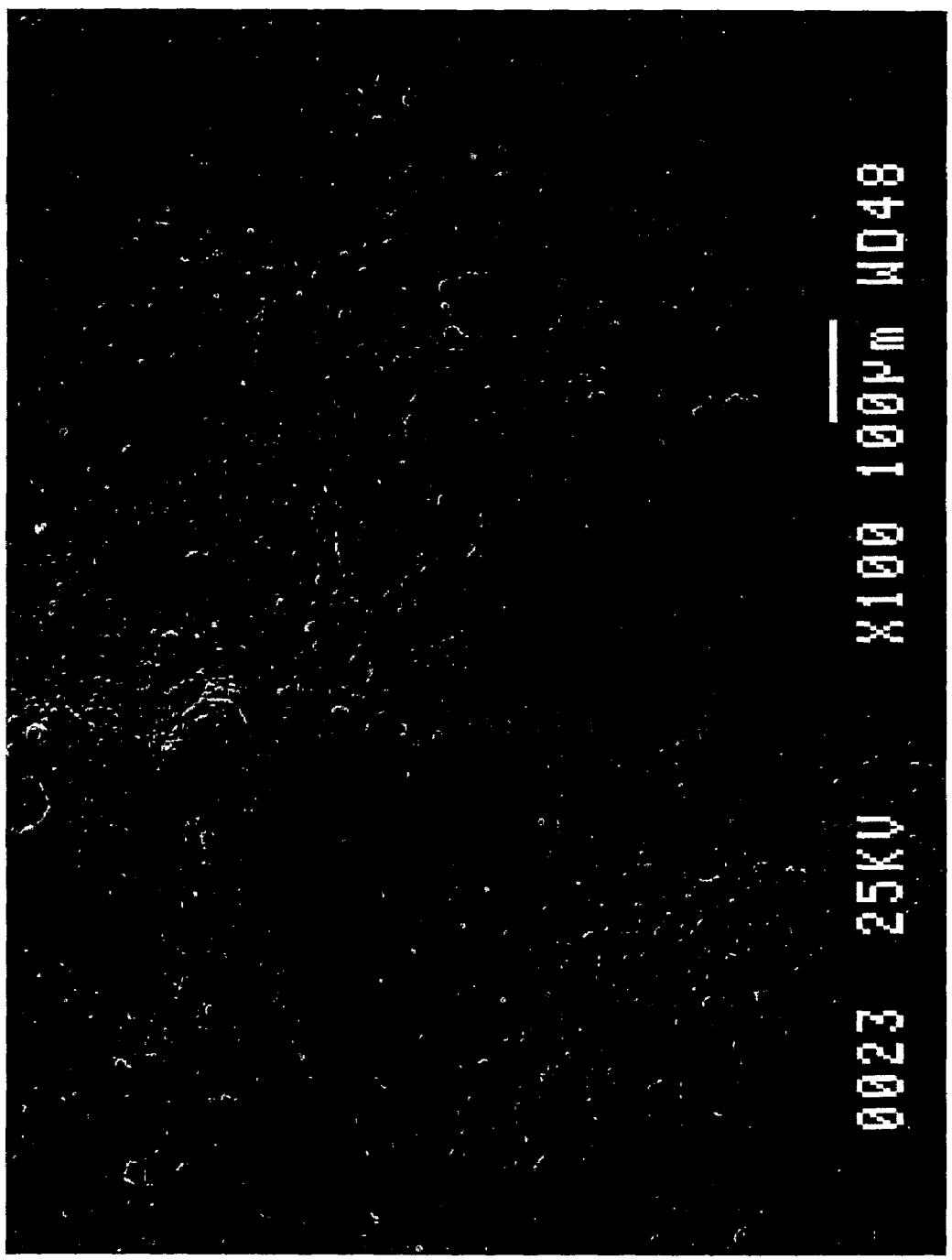
Figure 16:
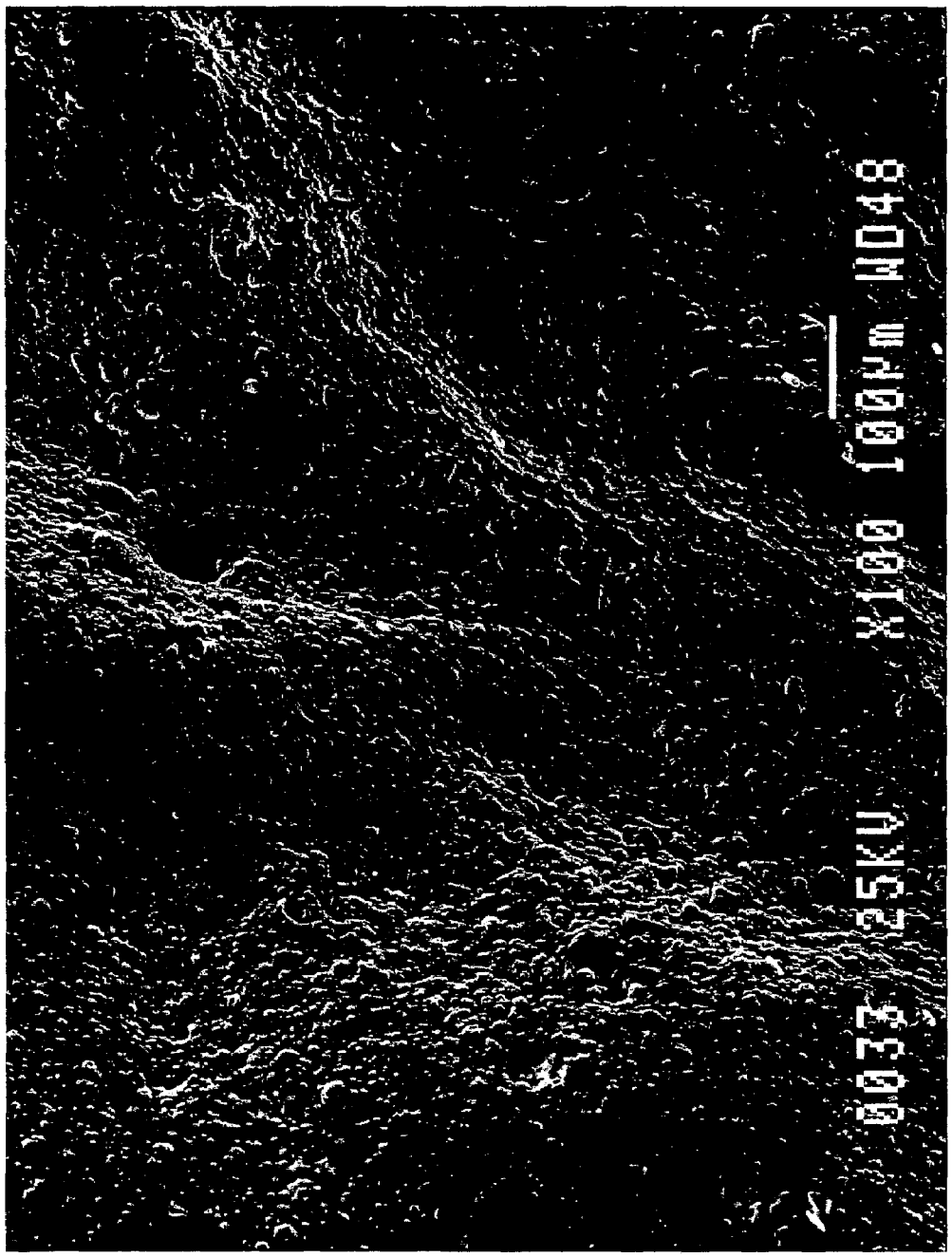
Figure 17:
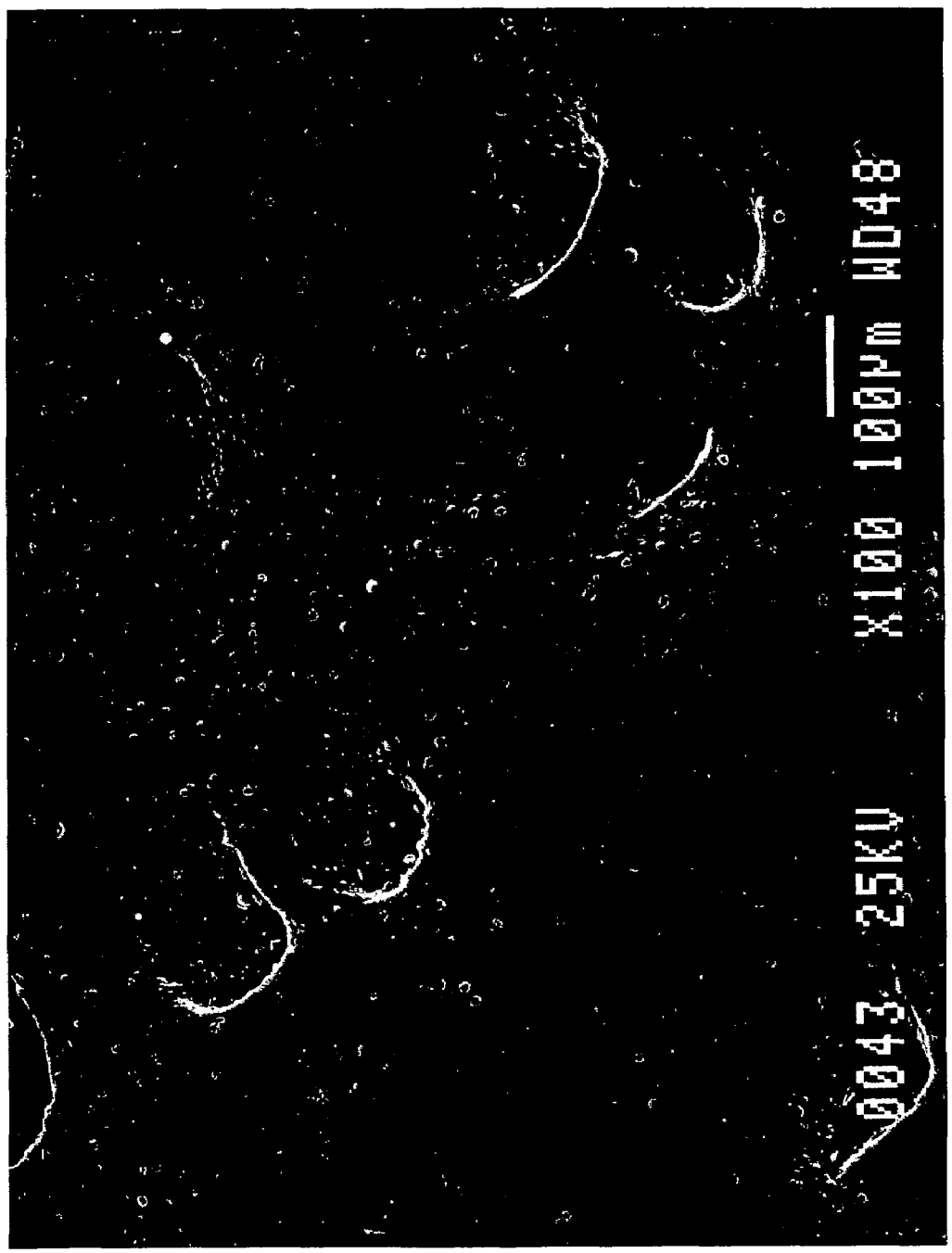
Figure 18:
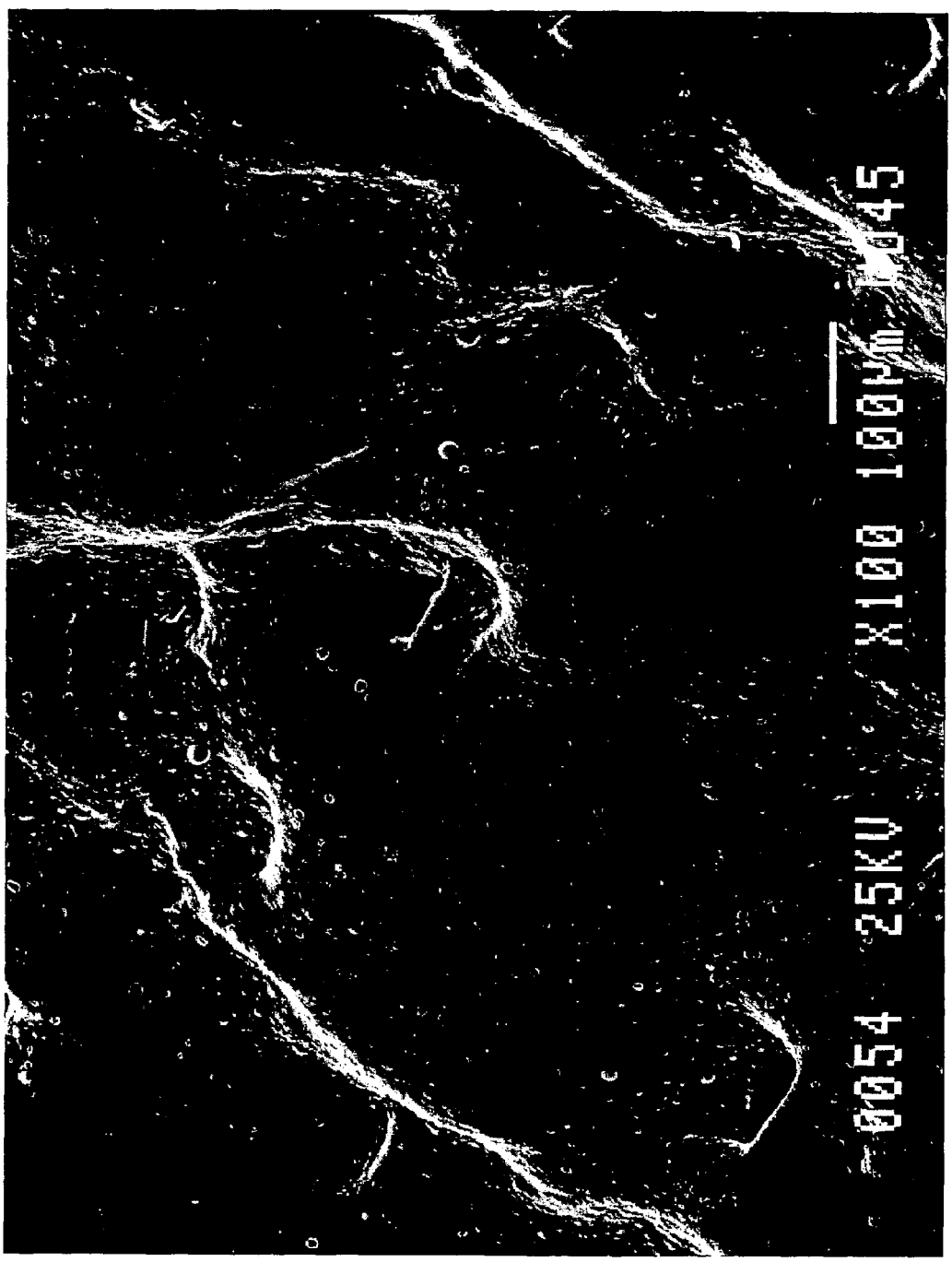
Figure 19:
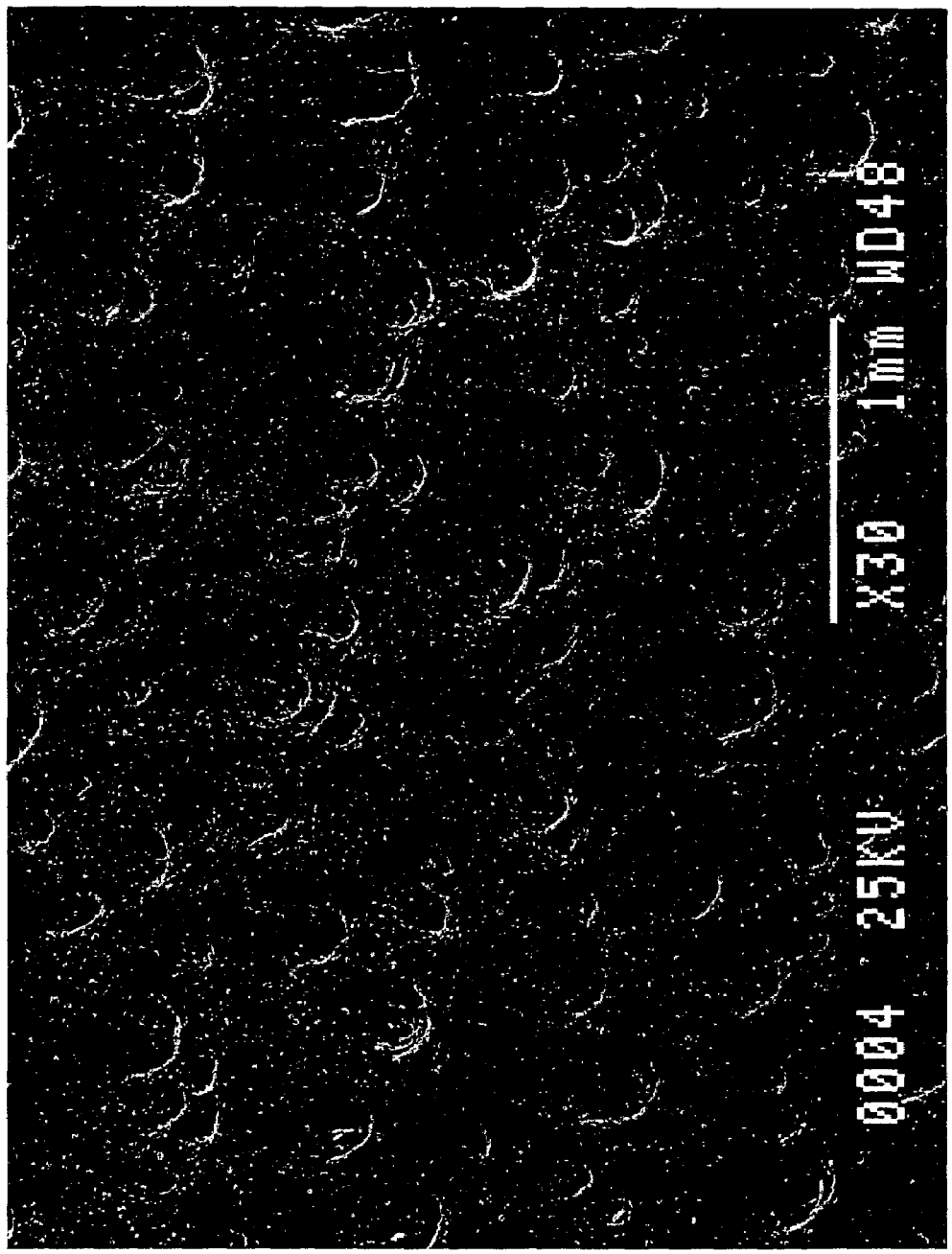
FIGS. 19-24 are scanning electron micrographs of flat and curved surfaces of three representative samples of different leathers at 30× magnification.
Figure 20:
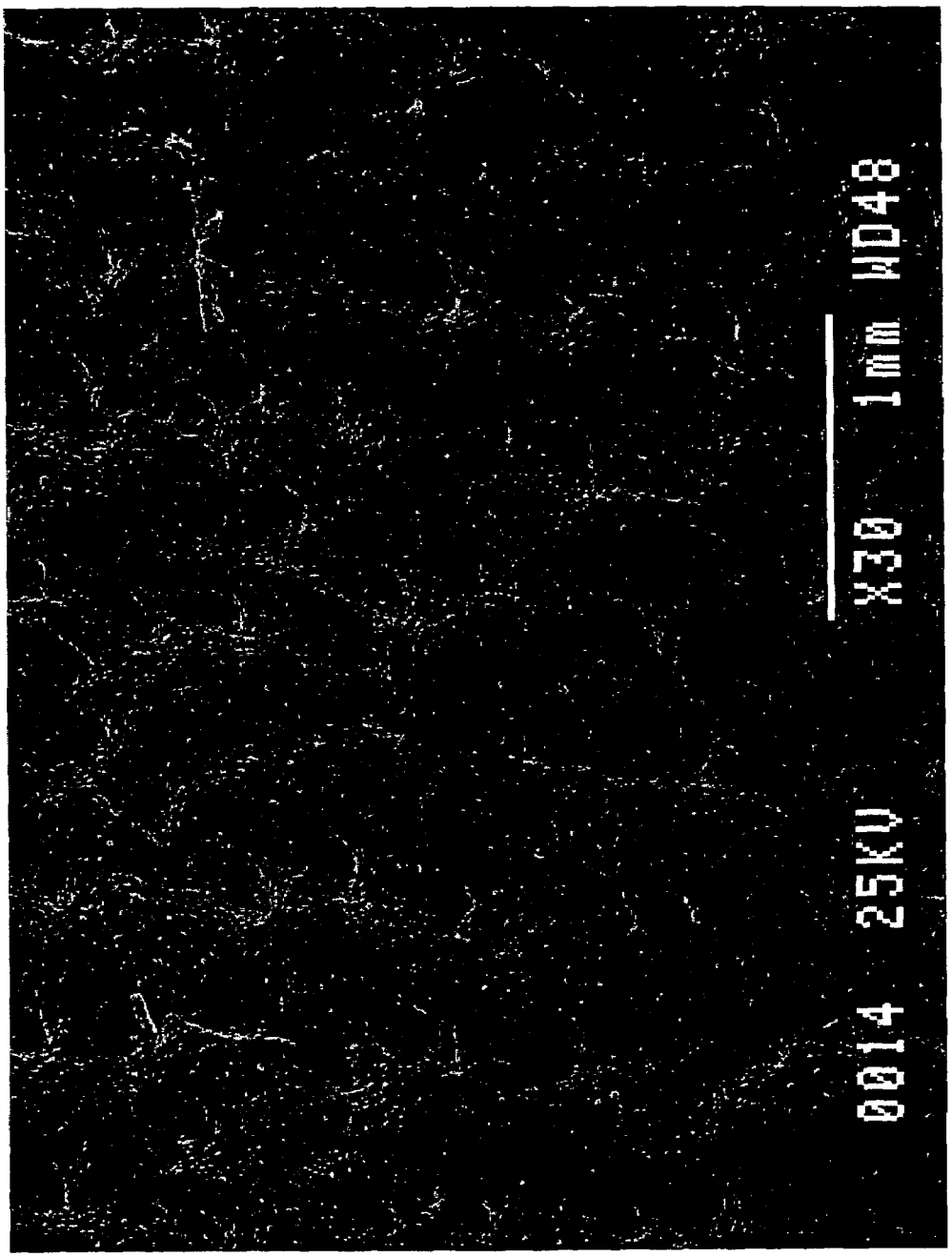
Figure 21:
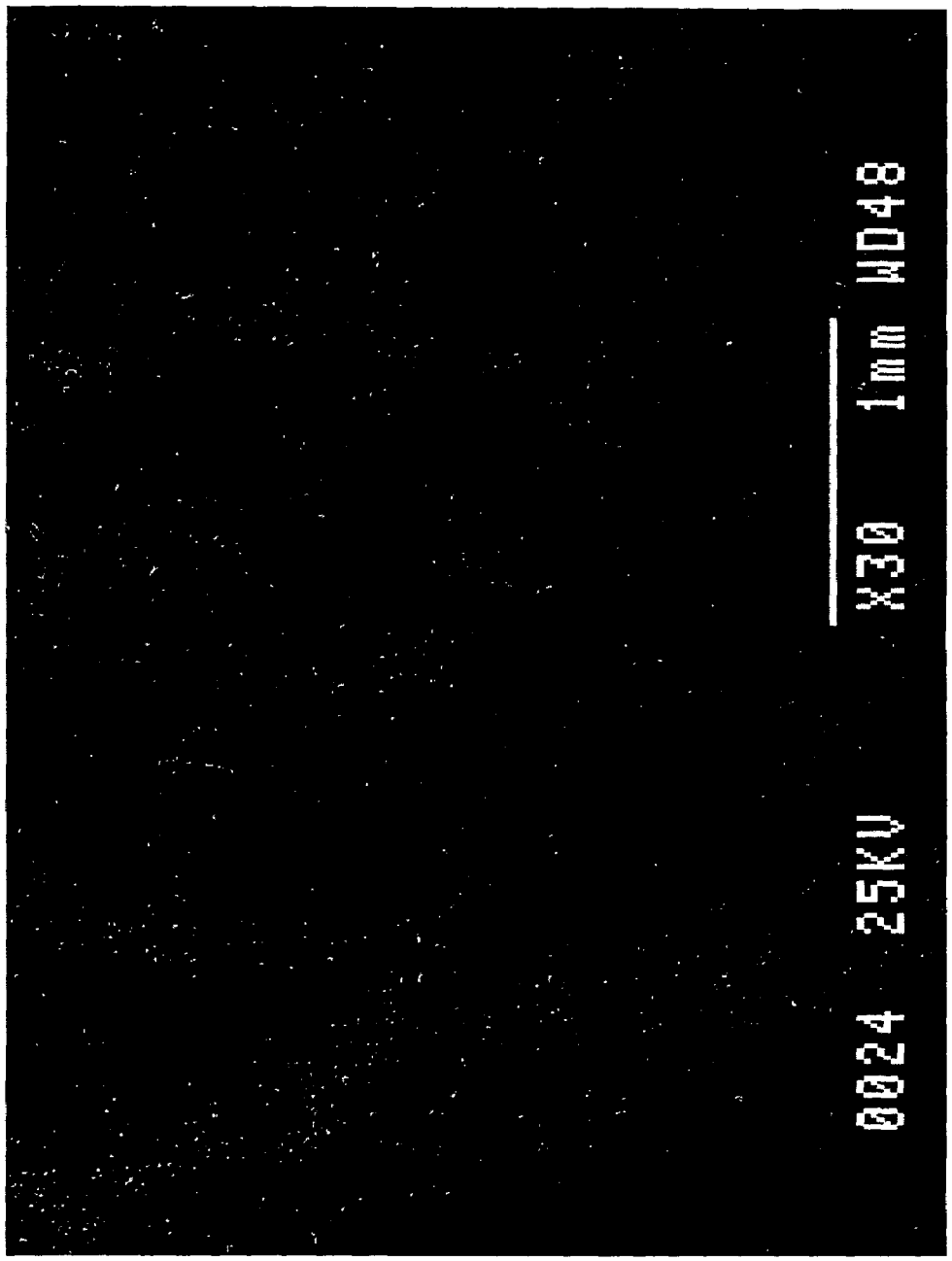
Figure 22:
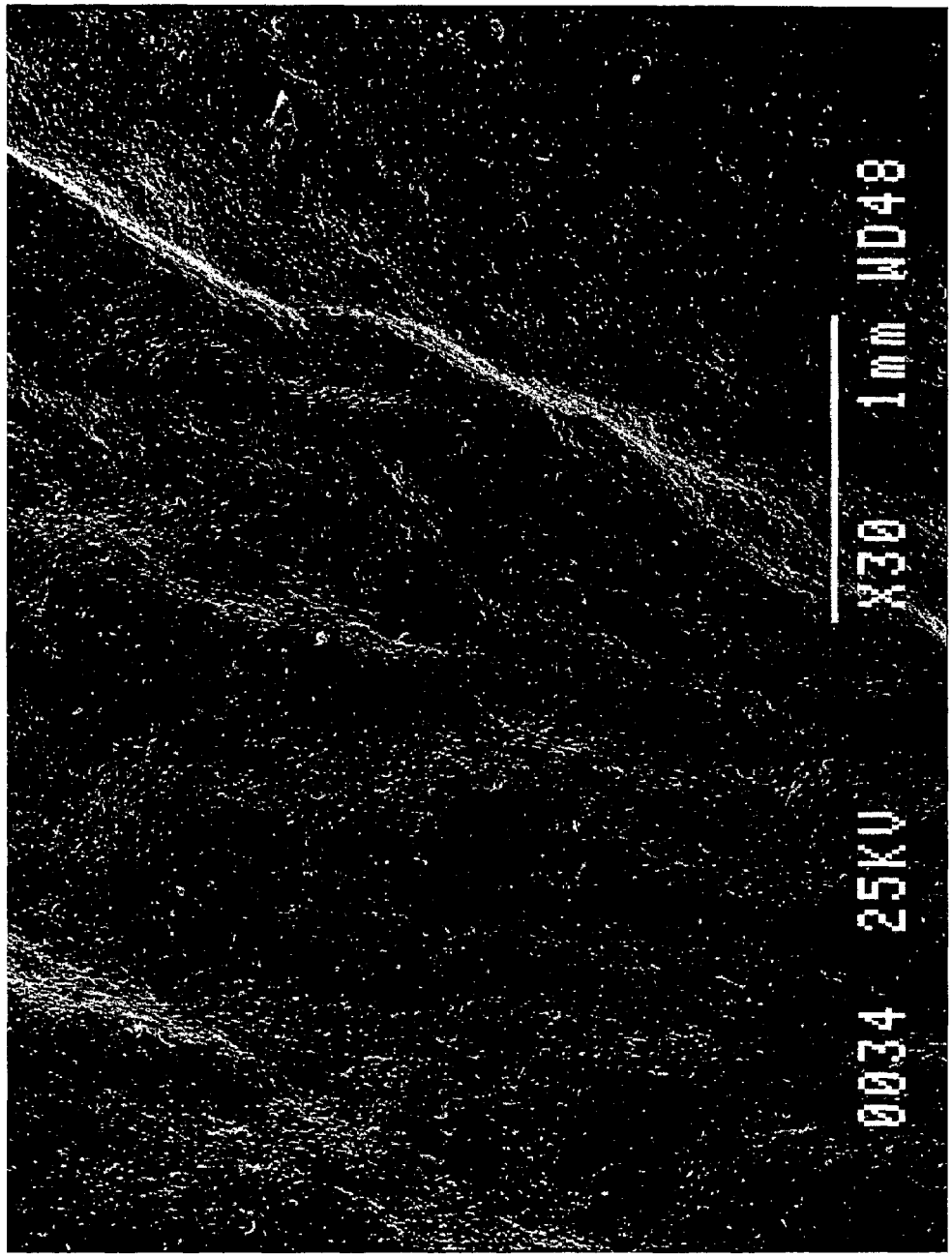
Figure 23:
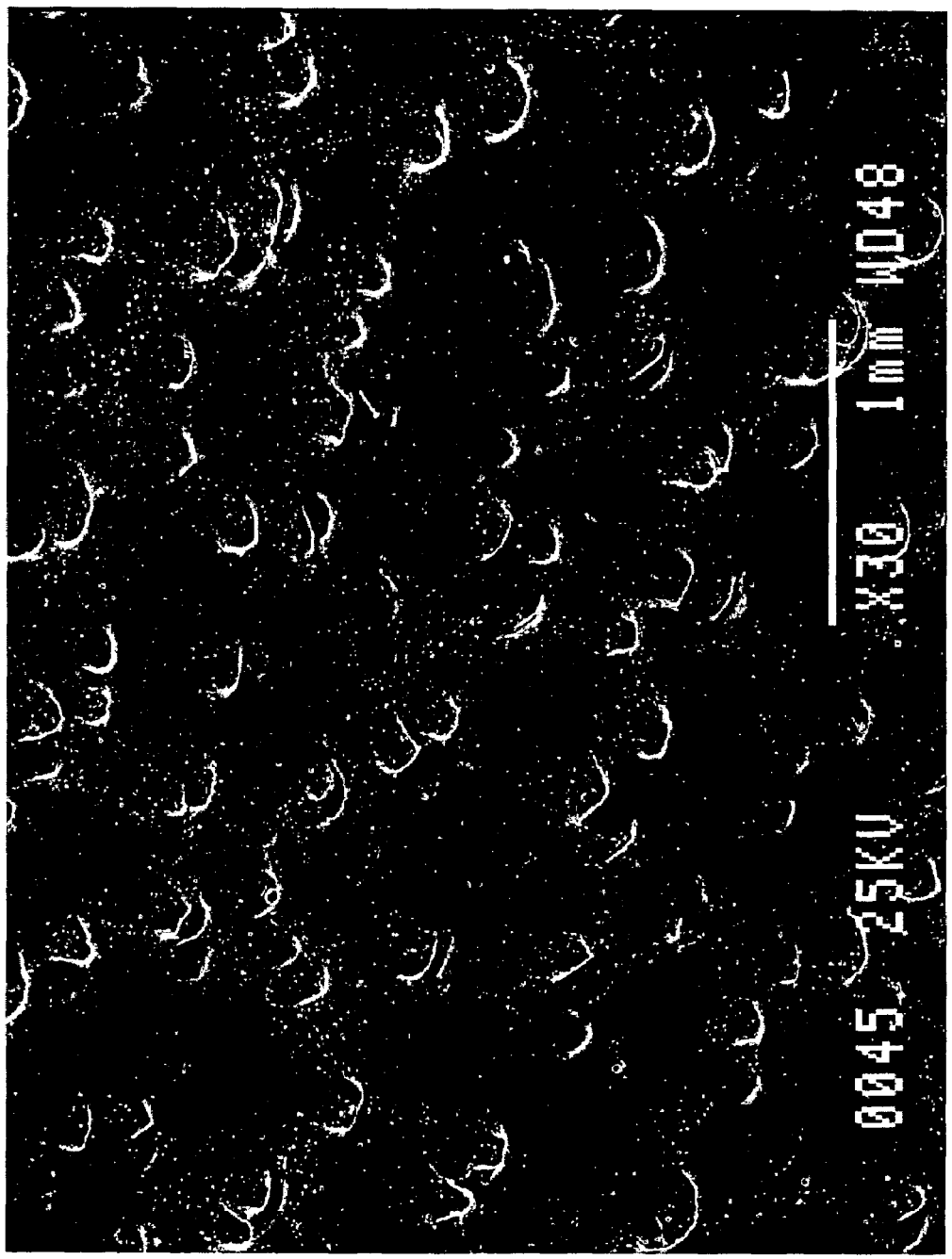
Figure 24:
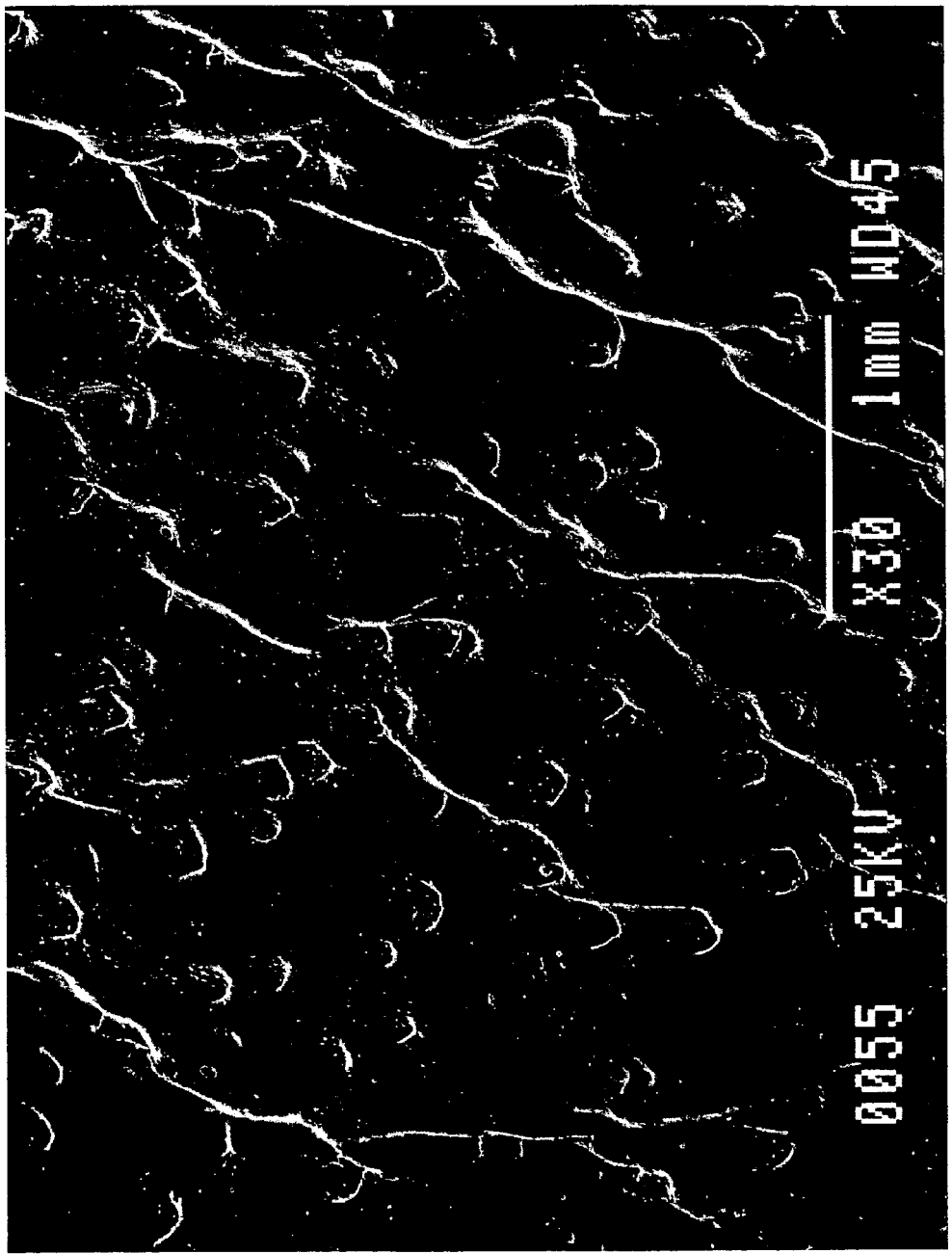
Figure 25:
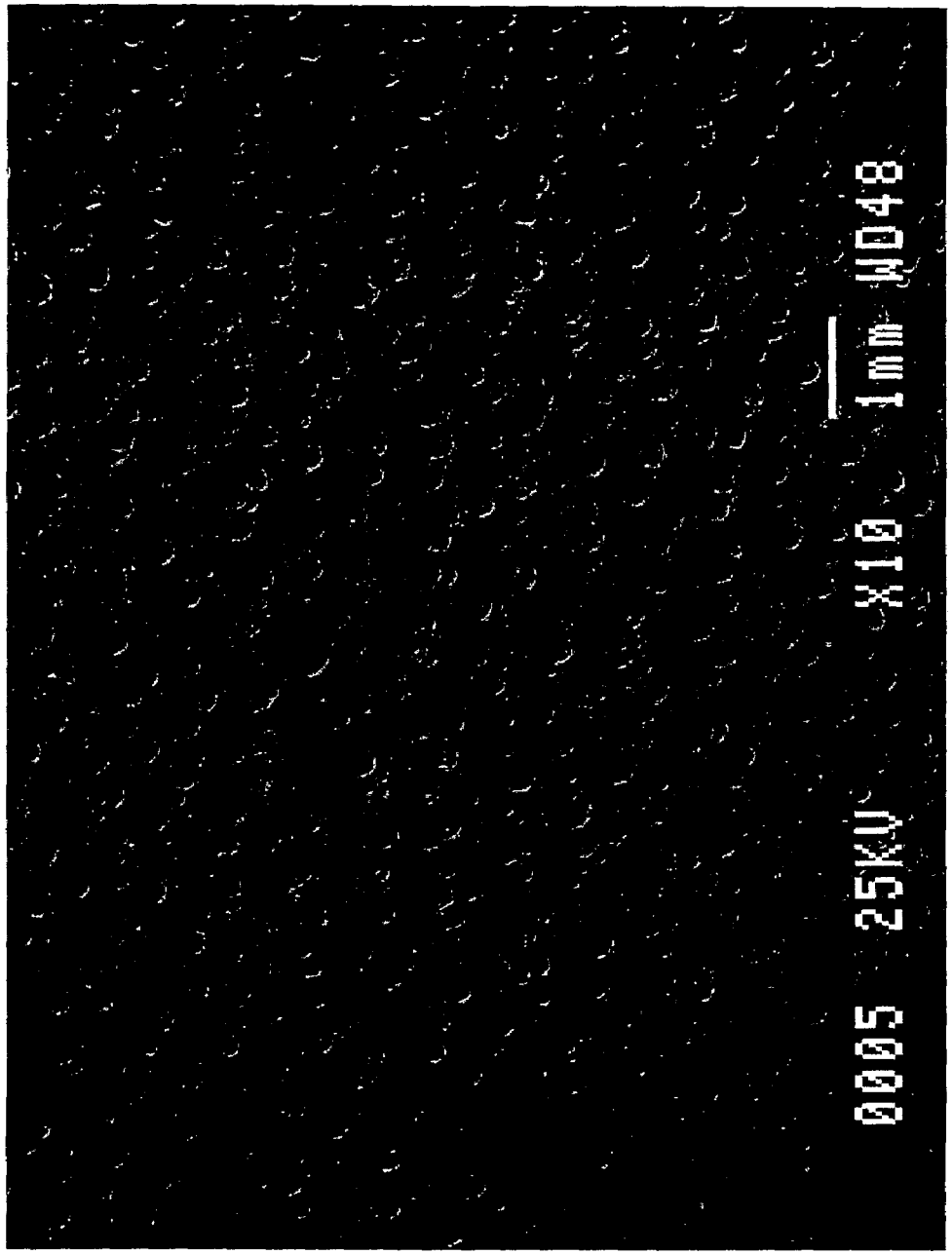
FIGS. 25-30 are scanning electron micrographs of flat and curved surfaces of three representative samples of different leathers at 10× magnification.
Figure 26:
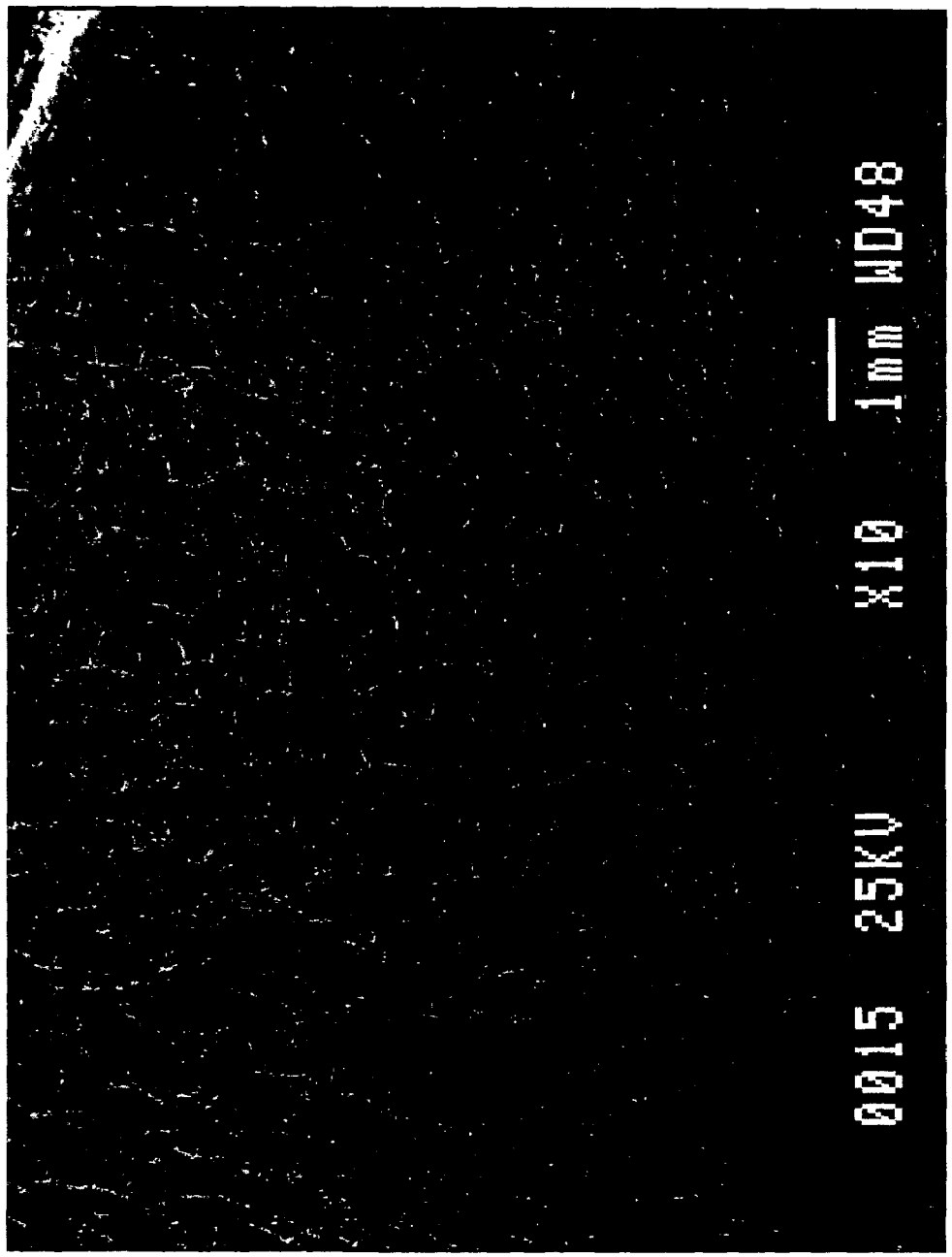
Figure 27:
Figure 28:
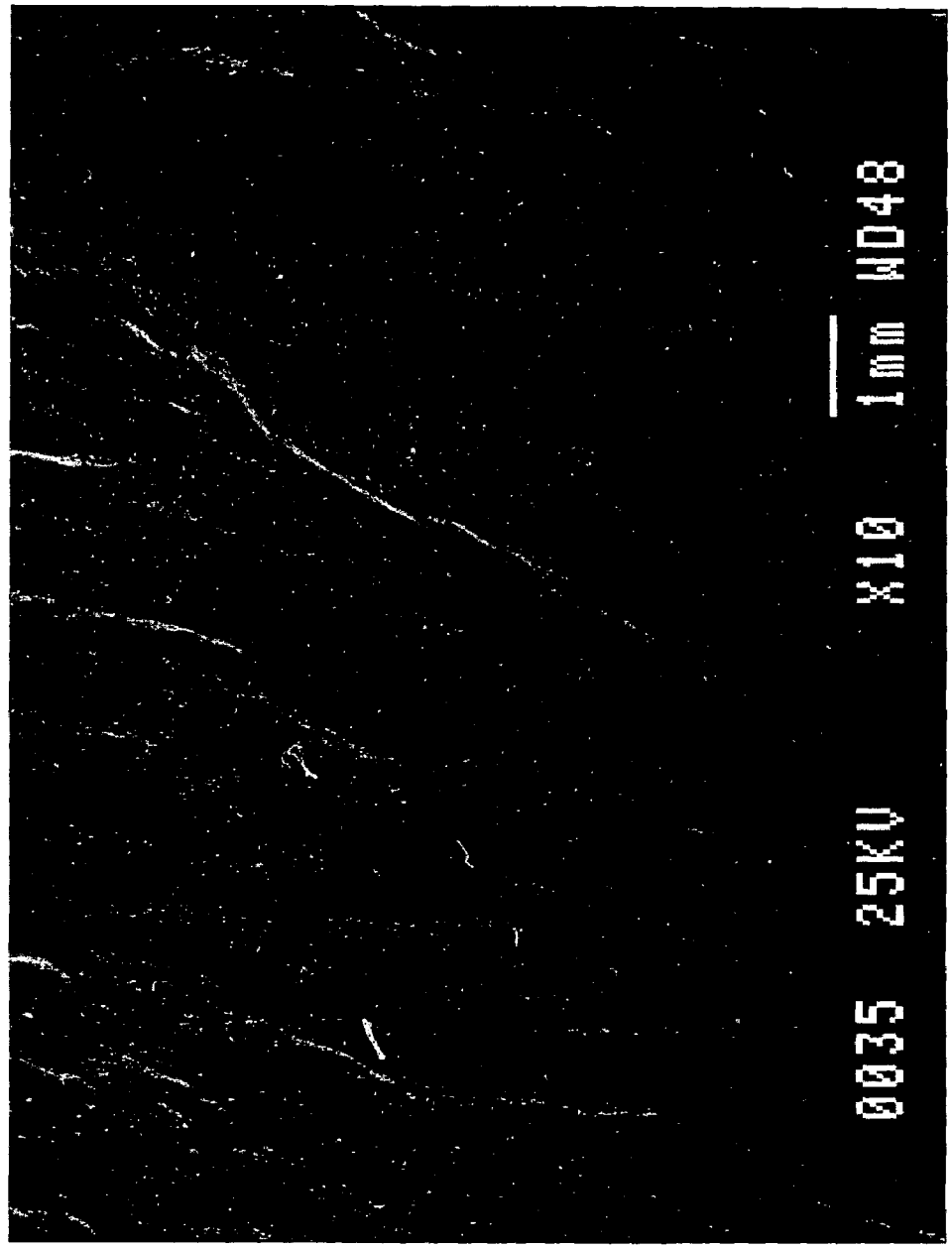
Figure 29:
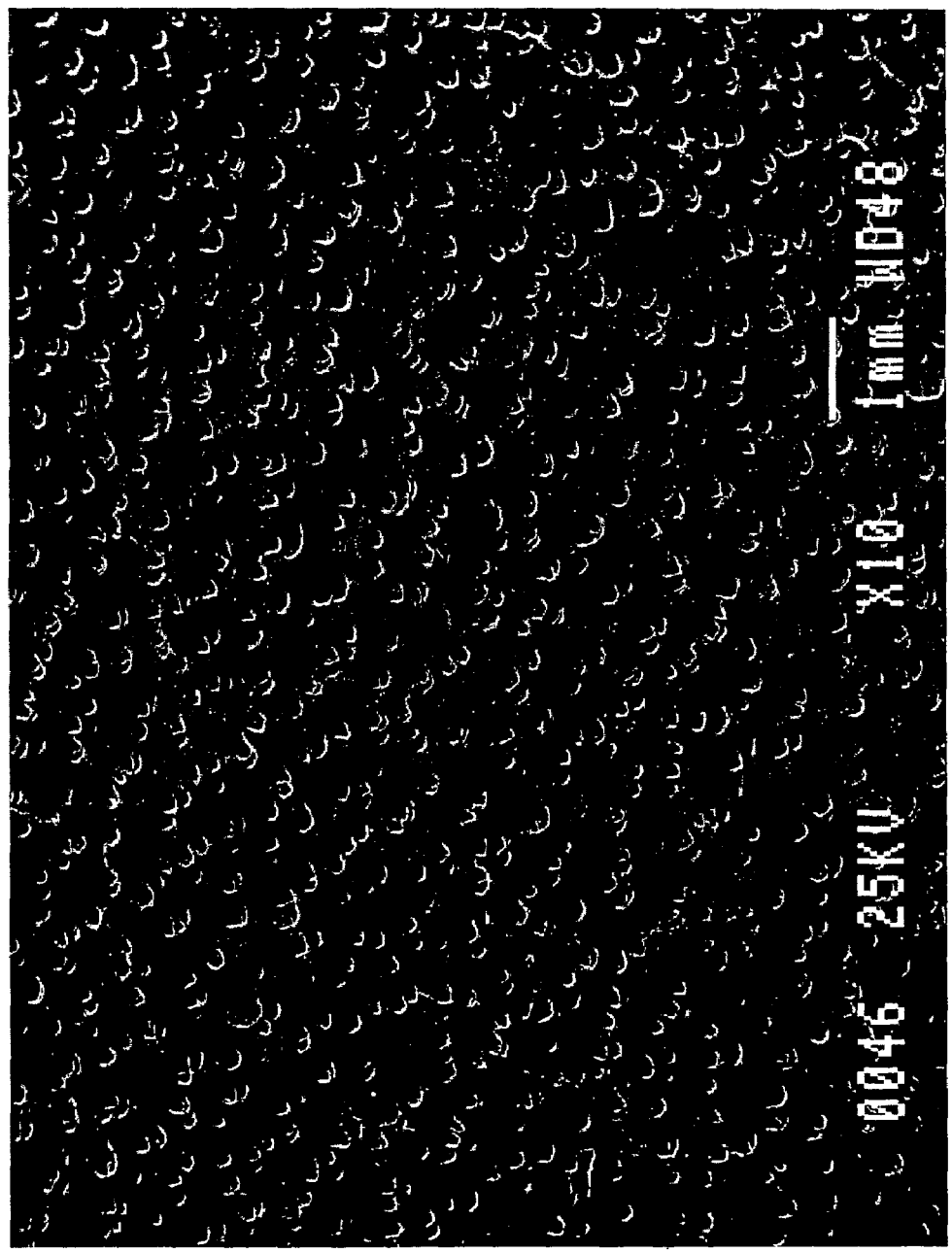
Figure 30:
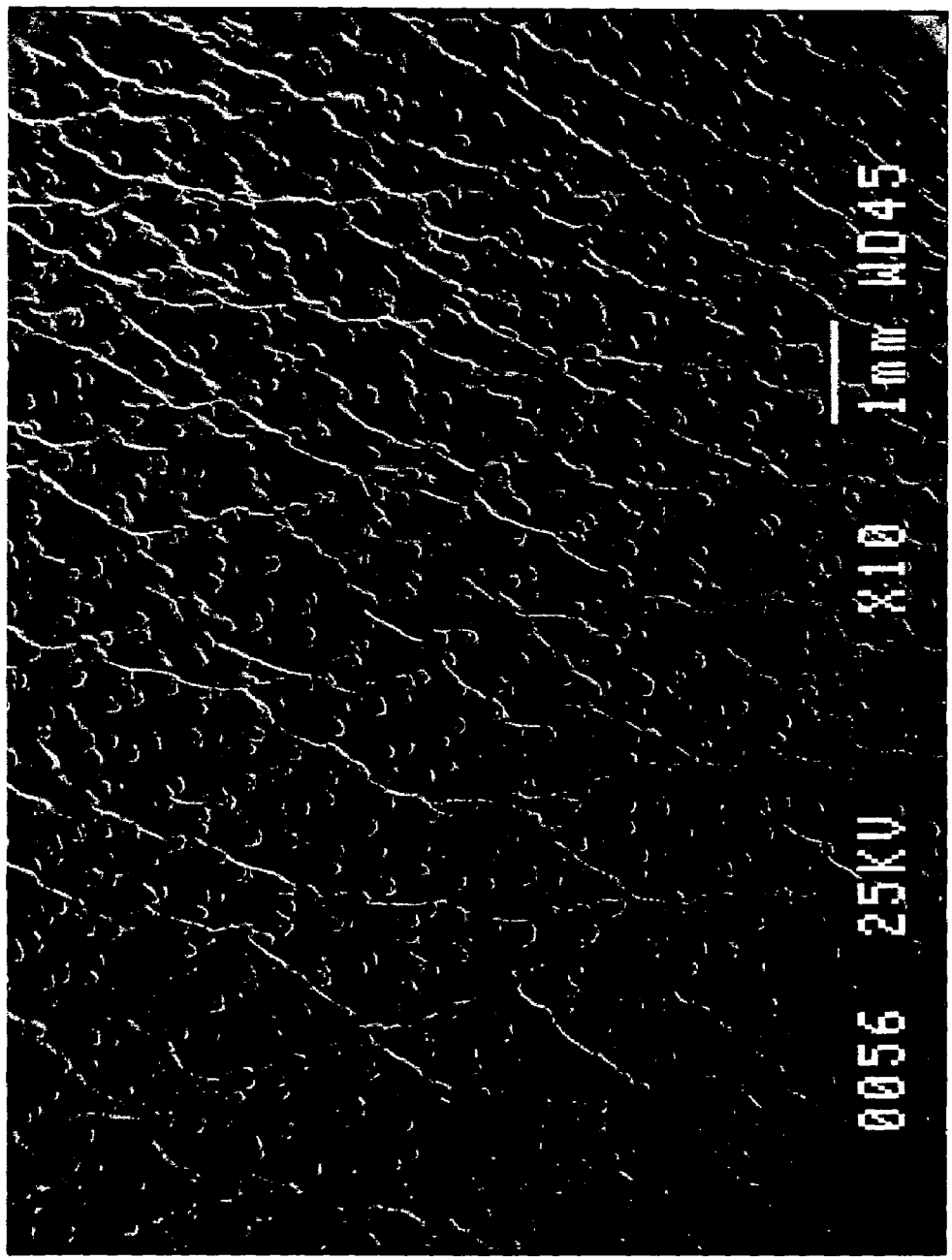

The degree of toughness of the leather of the present invention ("Prestige"), as well as prior art Nappa and Black Furniture leathers, was evaluated by determining their respective toughness indices. The present leather and Black Furniture leather exhibited similar toughness indices that was approximately 45% higher than Nappa leather (FIG. 15). Thus, when Nappa leather is bent when affixed with backing tape to a substrate, its usual good break formation is altered, and it exhibits the least strength, robustness, and softness of the three leathers, which correlates with an undesirable break pattern.

Although the invention has been described with particularity above, with reference to particular compositions, methods and materials, the invention is to be limited only insofar as is set forth in the accompanying claims.

The invention claimed is:

1. A leather finishing method, comprising:
    applying to tanned hides a base coat containing at least two polymers in an aqueous composition;
    drying the base-coated tanned hides;
    top-coating the base-coated tanned hides;
    drying the top-coated and base-coated tanned hides;
    loading the dried, base-coated and top-coated tanned hides into drums that contain water, said water containing an acid fixation agent;
    immersing the dried, base-coated and top-coated tanned hides in the water; and
    tumbling the dried, base-coated and top-coated tanned hides in the water,
    wherein the base is fixed with the acid fixation agent.

2. The method of claim 1, wherein said acid fixation agent is selected from the group consisting of formic acid, acetic acid, propionic acid and hydrochloric acid, wherein the at least two polymers are polyurethane and acrylic, and further wherein the base coat contains about 0.4% isopropranol by weight.

3. The method of claim 2, wherein the base coat contains about 10% silica duller by weight, about 22% silica drier by weight, and about 2 to 3% pigment by weight.

4. The method of claim 3, wherein the base coat contains about 60% of the aqueous composition of polymers by weight comprised of between 10 to 40% acrylic by weight.

5. The method of claim 3, wherein the base coat contains about 60% of the aqueous composition of polymers by weight comprised of between 15 to 30% acrylic by weight.

6. The method of claim 3, wherein the base coat contains about 60% of the aqueous composition of polymers by weight comprised of about 20% acrylic by weight.

7. The method of claim 3, wherein the base coat contains about 60% of the aqueous composition of polymers by weight comprised of between 1 to 10% polyurethane by weight.

8. The method of claim 3, wherein the base coat contains about 60% of the aqueous composition of polymers by weight comprised of between 2 to 4% polyurethane by weight.

9. The method of claim 3, wherein the base coat contains about 60% of the aqueous composition of polymers by weight comprised of about 2% polyurethane by weight.

10. The method of claim 9, wherein the acrylic and the polyurethane polymers are acidified.

11. The method of claim 10, wherein the acidified acrylic and acidified polyurethane are admixed with an amine to form carboxylic acid salts.

12. The method of claim 1, wherein application of the base coat is selected from the group consisting of spray, roll coat, and reverse roll coat.

13. The method of claim 12, wherein 1.0 to 4.0 grams of base coat is applied per square foot of the tanned hides.

14. The method of claim 12, wherein 1.25 to 3.5 grams of base coat is applied per square foot of the tanned hides.

15. The method of claim 12, wherein 1.5 to 1.7 grams of base coat is applied per square foot of the tanned hides.

16. The method of claim 1, wherein the water is warm.

17. The method of claim 2, wherein the acid fixation agent is present in the water between about 0.1 to 2.0% by weight.

18. The method of claim 1, wherein the top coat is clear.

19. The method of claim 1, wherein the tanned hides are dried at a temperature between about 75 to 100 degrees C. after both the base-coating step and the top-coating step.

20. The method of claim 1, wherein the dried, base-coated and top-coated tanned hides are immersed in 150 to 300% water by weight, said water between 30 to 55 degrees C.

21. The method of claim 1, wherein the dried, base-coated and top-coated tanned hides are immersed in 150 to 300% water by weight, said water between 35 to 50 degrees C.

22. The method of claim 1, wherein the dried, base-coated and top-coated tanned hides are immersed in 150 to 300% water by weight, said water about 45 degrees C.

23. The method of claim 1, wherein the base-coated and top-coated tanned hides are tumbled for about one hour.

24. The method of claim 23, further comprising subsequent to tumbling the base-coated and top-coated tanned hides in the warm water, the steps of remilling and softening of the base-coated tanned hides.

25. The method of claim 24, wherein prior to top-coating, staking of the base-coated hides is performed, with the staking comprising using a specialized machine in which plates are equipped with a plurality of engaging protrusions which push and pull at the tanned hide surface so that the tanned hide surface is stretched without being perforated.

26. A leather finishing method, comprising:
    applying to tanned hides a base coat containing at least a polyurethane salt and an acrylic salt in an aqueous composition;
    loading the tanned bides into drums containing water, wherein said water is between 150 to 300% water by weight, said water between 30 to 55 degrees C.;
    adding at least one acid fixation agent to the warm water, said acid fixation agent including but not limited to about 0.1 to 2.0% by weight of an acid;
    immersing the tanned hides into the water;
    tumbling the tanned hides in the water for about one hour;
    gently squeeze-drying the tanned hides;
    toggling the tanned hides;
    milling the tanned hides for about 8 hours;
    staking the tanned hides;
    spraying the tanned hides with at least one top coat;
    remilling the tanned hides; and
    softening the tanned hides.

27. The method according to claim 26, wherein the acid fixation agent is selected from the group consisting of formic acid, acetic acid, propionic acid and hydrochloric acid.

28. The method according to claim 27, further comprising drying the tanned hides between 75 to 100 degrees C. after application of the base coat and applying a clear top coat to the dried tanned hides prior to tumbling the tanned hides in the water.

29. The method according to claim 27, wherein 1.0 to 4.0 grams of base coat is applied per square foot of the tanned hides.

30. The method according to claim 27, wherein the base coat contains about 60% of an aqueous acrylic composition by weight comprised of between 10 to 40% acrylic by weight and about 0.4% isopropanol by weight, said aqueous acrylic composition admixed with between 1 to 10% polyurethane by weight, about 10% silica duller by weight, about 22% silica drier by weight, and between 2 to 3% pigment by weight.

31. The method according to claim 27, wherein the staking comprises using a specialized machine in which plates are equipped with a plurality of engaging protrusions which push and pull at the tanned hide surface whereby the tanned hide surface is stretched without being perforated.

32. A leather finishing method, comprising:
applying to tanned hides a base coat containing at least a polyurethane salt and an acrylic salt in an aqueous composition, wherein about 60% of the aqueous composition by weight is comprised of about 20% acrylic by weight and about 2% polyurethane by weight, about 0.4% isopropanol by weight, about 10% silica duller by weight, about 22% silica drier by weight, and between 2 to 3% pigment by weight;
loading the tanned hides into drums containing warm water, wherein said warm water is between 150 to 300% by weight 45 degrees C.;
adding at least 0.1 to 2% of an acid fixation agent to the warm water, said acid fixation agent selected from the group consisting of formic acid, acetic acid, propionic acid and hydrochloric acid;
immersing the tanned hides into the warm water;
tumbling the tanned hides in the warm water for about one hour;
gently squeeze-drying the tanned hides;
toggling the tanned hides;
milling the tanned hides for about 8 hours;
staking the tanned hides using a specialized machine in which plates are equipped with a plurality of engaging protrusions which push and pull at the tanned hide surface whereby the tanned hide surface is stretched without being perforated;
spraying the tanned hides with at least one top coat;
remilling the tanned hides; and
softening the tanned hides.

33. A natural grain leather manufactured according to the method of claim 1, comprising:
a natural grain leather sheet which exhibits an energy/count ratio of 1.6 or less when subjected to acoustic emission testing.

34. A natural grain leather produced according to the method of claim 1.

* * * * *